United States Patent
Li et al.

(10) Patent No.: US 11,468,153 B2
(45) Date of Patent: *Oct. 11, 2022

(54) TERMINAL DEVICE MANAGEMENT METHOD AND TERMINAL DEVICE

(71) Applicant: HUAWEI TECHNOLOGIES CO., LTD., Shenzhen (CN)

(72) Inventors: Teng Li, Beijing (CN); Xiangdong Li, Beijing (CN); Zheng Hu, Shenzhen (CN); Yaxin Bai, Shenzhen (CN); Xuesong Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/977,041

(22) PCT Filed: Apr. 13, 2018

(86) PCT No.: PCT/CN2018/083057
§ 371 (c)(1),
(2) Date: Aug. 31, 2020

(87) PCT Pub. No.: WO2019/184011
PCT Pub. Date: Oct. 3, 2019

(65) Prior Publication Data
US 2021/0042402 A1 Feb. 11, 2021

(30) Foreign Application Priority Data
Mar. 28, 2018 (CN) .......................... 201810264881.6

(51) Int. Cl.
*G06F 21/00* (2013.01)
*G06F 21/32* (2013.01)
(Continued)

(52) U.S. Cl.
CPC .............. *G06F 21/32* (2013.01); *G06F 21/12* (2013.01); *G06F 21/73* (2013.01)

(58) Field of Classification Search
CPC .......... G06F 21/12; G06F 21/32; G06F 21/73; H04W 12/30; H04W 12/68
See application file for complete search history.

(56) References Cited

U.S. PATENT DOCUMENTS 7,697,729 B2   4/2010  Howell et al.
8,165,355 B2   4/2012  Benkley et al.
(Continued)

FOREIGN PATENT DOCUMENTS

CN   102594980 A   7/2012
CN   102752441 A   10/2012
(Continued)

OTHER PUBLICATIONS

Mihael Ankerst, Markus M. Breunig, Hans-Peter Kriegel and Joörge Sander, "OTPICS: Ordering Points to Identify the Clustering Structure", Institute for Computer Science, University of Munich, ACM, 1999, pp. 49-60. (Year: 1999).*

(Continued)

*Primary Examiner* — Joseph P Hirl
*Assistant Examiner* — Chi D Nguy
(74) *Attorney, Agent, or Firm* — Stein IP, LLC

(57) ABSTRACT

Operation information corresponds to a first operation, where the operation information includes touch information and/or posture information of a terminal device, and manages the terminal device based on a matching degree between the operation information corresponding to the first operation and a first decision model, where the first decision model is determined based on operation information of an operation performed by a first user. According to a terminal device management method, because an operation of a user (Continued)

200

Obtain operation information corresponding to a first operation, where the operation information includes touch information and/or posture information of a terminal device — S210

Manage the terminal device based on a matching degree between the operation information corresponding to the first operation and a first decision model, where the first decision model is determined based on operation information of an operation performed by a first user — S220 is habitual, a same user (namely, the first user) may generate a large quantity of similar operations in a process of operating the terminal device. Training is performed by using a plurality of operations of the first user, and a decision model is obtained. Based on the decision model, it can be determined whether an operation is performed by the first user.

16 Claims, 6 Drawing Sheets

(51) Int. Cl.
  *G06F 21/12* (2013.01)
  *G06F 21/73* (2013.01)

(56) References Cited

U.S. PATENT DOCUMENTS

| | | | |
|---|---|---|---|
| 8,229,184 | B2 | 7/2012 | Benkley et al. |
| 8,278,946 | B2 | 10/2012 | Thompson et al. |
| 8,279,182 | B2 | 10/2012 | Kim et al. |
| 8,315,444 | B2 | 11/2012 | Gardner |
| 8,358,815 | B2 | 1/2013 | Benkley et al. |
| 8,443,199 | B2 | 5/2013 | Kim et al. |
| 8,693,736 | B2 | 4/2014 | Benkley et al. |
| 9,201,539 | B2 | 12/2015 | Hinckley et al. |
| 2008/0042983 | A1 | 2/2008 | Kim et al. |
| 2009/0083847 | A1 | 3/2009 | Fadell et al. |
| 2009/0083850 | A1 | 3/2009 | Fadell et al. |
| 2012/0154296 | A1 | 6/2012 | Hinckley et al. |
| 2012/0293404 | A1 | 11/2012 | Federico et al. |
| 2013/0082945 | A1 | 4/2013 | Jo |
| 2013/0244574 | A1* | 9/2013 | Okuno ............... G06F 3/04817 455/26.1 |
| 2014/0109024 | A1 | 4/2014 | Miyazaki |
| 2014/0181962 | A1 | 6/2014 | Seo et al. |
| 2014/0283142 | A1 | 9/2014 | Shepherd et al. |
| 2014/0292670 | A1 | 10/2014 | Cho |
| 2015/0047017 | A1 | 2/2015 | Kim et al. |
| 2017/0017825 | A1 | 1/2017 | Choi et al. |
| 2019/0236249 | A1* | 8/2019 | Pavlou ............... G06F 16/24578 |

FOREIGN PATENT DOCUMENTS

| | | |
|---|---|---|
| CN | 103176727 A | 6/2013 |
| CN | 103440445 A | 12/2013 |
| CN | 103516907 A | 1/2014 |
| CN | 103530047 A | 1/2014 |
| CN | 103530543 A | 1/2014 |
| CN | 103678965 A | 3/2014 |
| CN | 103870041 A | 6/2014 |
| CN | 104036177 A | 9/2014 |
| CN | 104077518 A | 10/2014 |
| CN | 104217151 A | 12/2014 |
| CN | 104318138 A | 1/2015 |
| CN | 104346063 A | 2/2015 |
| CN | 104346549 A | 2/2015 |
| CN | 104572127 A | 4/2015 |
| CN | 104572175 A | 4/2015 |
| CN | 104598134 A | 5/2015 |
| CN | 104834520 A | 8/2015 |
| CN | 104850433 A | 8/2015 |
| CN | 105068743 A | 11/2015 |
| CN | 105141768 A | 12/2015 |
| CN | 105893809 A | 8/2016 |
| CN | 106714163 A | 5/2017 |
| CN | 107026731 A | 8/2017 |
| JP | 2008009835 A | 1/2008 |
| JP | 2013025357 A | 2/2013 |
| JP | 2013140440 A | 7/2013 |
| JP | 2015167022 A | 9/2015 |
| KR | 20080000481 A | 1/2008 |
| KR | 20130036679 A | 4/2013 |
| KR | 20150018256 A | 2/2015 |
| KR | 101552116 B1 | 9/2015 |
| WO | 2016126867 A1 | 8/2016 |

OTHER PUBLICATIONS

Mihael Ankerst, Markus M. Breunig, Hans-Peter Kriegel and Jörge Sander, "OTPICS: Ordering Points to Identify the Clustering Structure", Institute for Computer Science, University of Munich, ACM, 1999, pp. 49-60. (Year: 1999).*

Gao, Ming, Xihong Hu, Bo Cao, and Dianxin Li. "Fingerprint sensors in mobile devices." In Industrial Electronics and Applications (ICIEA), 2014 IEEE 9th Conference on, pp. 1437-1440. IEEE, 2014.

Bromba Biometrics,"Fingerprint Cellphone",Bromba GmbH,dated Jan. 26, 2011,total 3 pages.

Kris Carlon, "Huawei Ascend Mate 7 review: the best finger scanner on Android," online, URL, https://www.androidpit.com/huawei-ascend-mate-7-review, Sep. 10, 2014,total 18 pages.

* cited by examiner

TERMINAL DEVICE MANAGEMENT METHOD AND TERMINAL DEVICE

This application is a national stage of International Application No. PCT/CN2018/083057, filed on Apr. 13, 2018, which claims priority to Chinese Patent Application No. 201810264881.6, filed on Mar. 28, 2018. Both of the aforementioned applications are hereby incorporated by reference in their entireties.

TECHNICAL FIELD

Aspects of this application elate to the field of man-machine interaction, and more specifically, to a terminal device management method and a terminal device.

BACKGROUND

Currently, a technology is known such that before an application program is started on a terminal device or an operation interface is displayed on a terminal device, verification may be performed in a manner such as entering a password (for example, a numerical password or a gesture password), and after the verification succeeds, the application program is allowed to be started or the operation interface allows to be displayed.

However, in the foregoing technology, there is a possibility of password leakage. For example, a family member (for example, a child of an owner of the terminal device) of the owner may learn of a password set by the owner, so that the family member can operate the terminal device, thereby seriously reducing security of the terminal device.

Therefore, it is expected to provide a technology to improve the security of the terminal device.

SUMMARY

Aspects of this application provide a terminal device management method and apparatus, to improve security of a terminal device.

According to a first aspect, a terminal device management method is provided, including: obtaining operation information corresponding to a first operation, where the operation information includes touch information and/or posture information of a terminal device; and managing the terminal device based on a matching degree between the operation information corresponding to the first operation and a first decision model, where the first decision model is determined based on operation information of an operation performed by a first user.

According to a terminal device management method in this application, because an operation of a user is habitual, a same user (namely, the first user) may generate a large quantity of similar operations in a process of operating the terminal device. Training is performed by using a plurality of operations of the first user, and a decision model is obtained. Based on the decision model, it can be decided (determined) whether an operation is performed by the first user. Therefore, use security of the terminal device can be improved.

Optionally, the touch information includes at least one of the following information: information about a force of a touch operation, information about a position of the touch operation, information about a contact area of the touch operation, information about a contact time of the touch operation, information about a sliding angle of the touch operation, information about a sliding direction of the touch operation, or information about a sliding distance of the touch operation.

Optionally, the first user includes an owner of the terminal device.

Optionally, the managing the terminal device based on a matching degree between the operation information corresponding to the first operation and a first decision model includes: when the matching degree between the operation information corresponding to the first operation and the first decision model is greater than a preset first threshold, performing processing corresponding to the first operation.

For example, when the first operation is an operation on a picture (for example, an operation of deleting the picture), if it is decided that the matching degree between the operation information corresponding to the first operation and the first decision model is greater than the preset first threshold, the picture may be processed (for example, deleting the picture) based on the operation.

Optionally, the managing the terminal device based on a matching degree between the operation information corresponding to the first operation and a first decision model includes: when the matching degree between the operation information corresponding to the first operation and the first decision model is greater than a preset first threshold, unlocking a first application.

For example, when the first operation is a pattern unlocking operation, if it is decided that the matching degree between the operation information corresponding to the first operation and the first decision model is greater than a preset first threshold, it may be determined that when an unlock pattern is correct, the pattern may unlock the terminal device.

Optionally, the managing the terminal device based on a matching degree between the operation information corresponding to the first operation and a first decision model includes: when the matching degree between the operation information corresponding to the first operation and the first decision model is less than a preset first threshold, forbidding (preventing) processing corresponding to the first operation.

For example, when the first operation is an operation on a picture (for example, an operation of deleting the picture), if it is decided that the matching degree between the operation information corresponding to the first operation and the first decision model is less than the preset first threshold, processing the picture based on the operation may be forbidden (for example, deleting the picture is forbidden).

Optionally, the managing the terminal device based on a matching degree between the operation information corresponding to the first operation and a first decision model includes: when the matching degree between the operation information corresponding to the first operation and the first decision model is less than a preset first threshold, switching an interface currently displayed of the terminal device to a screen lock interface.

Optionally, the managing the terminal device based on a matching degree between the operation information corresponding to the first operation and a first decision model includes: when the matching degree between the operation information corresponding to the first operation and the first decision model is less than a preset first threshold, playing a preset alert signal (sound).

Optionally, the managing the terminal device based on a matching degree between the operation information corresponding to the first operation and a first decision model includes: when the matching degree between the operation information corresponding to the first operation and the first decision model is less than the preset first threshold, locking a first application.

The first operation may be an operation for the first application, for example, an operation on an interface of the first application.

Alternatively, the first operation may be an operation before the first application is started, or the first operation may be an operation performed when the first application is running in the background.

Optionally, the first operation is an operation detected before a second operation used to start the first application is detected, and the unlocking a first application includes: when the second operation is detected, skipping displaying an unlock interface, and starting the first application.

Optionally, the first operation is an operation detected before a second operation used to start the first application is detected, and the locking a first application includes: when the second operation is detected, displaying an unlock interface.

Optionally, the first operation is an operation detected before a second operation used to start the first application is detected, and starting the first application is forbidden.

Optionally, the first operation is an operation used to unlock the first application.

Optionally, the first application includes at least one of the following applications: an application operated by the first operation, an application preset by an owner of the terminal device, or an application preset by a manufacturer of the terminal device.

Optionally, the managing the terminal device based on a matching degree between the operation information corresponding to the first operation and a first decision model includes: when the matching degree between the operation information corresponding to the first operation and the first decision model is less than a preset first threshold, determining a second decision model of a plurality of decision models based on the operation information corresponding to the first operation, where a matching degree between the second decision model and the operation information corresponding to the first operation is greater than a preset second threshold, or the second decision model is a decision model having a largest matching degree with the operation information corresponding to the first operation in the plurality of decision models, the plurality of decision models are in a one-to-one correspondence with a plurality of users, and each decision model is determined based on operation information of an operation performed by a corresponding user; and managing the terminal device based on user permission of a user corresponding to the second decision model.

Optionally, the method further includes: determining a plurality of pieces of training information based on user operations detected in a first time period, where the user operations include operations performed by a plurality of users, and the training information includes touch operation information of the user operations and/or posture information of the terminal device during the user operations; performing clustering processing on the plurality of pieces of training information, to determine at least one training information set; determining, based on information about a second user of the plurality of users, a first training information set corresponding to the second user of the at least one training information set; and determining a decision model for the second user based on training information in the first training information set.

Optionally, the performing clustering processing on the plurality of pieces of training information includes: performing clustering processing on the plurality of pieces of training information based on a preset third threshold, where density of training information in each training information set is greater than or equal to the third threshold; and the determining, based on information about a second user of the plurality of users, a first training information set corresponding to the second user of the plurality of training information sets includes: when the information about the second user indicates that the second user is an owner of the terminal device, determining a training information set having highest density of training information in the plurality of training information sets as the first training information set.

Optionally, the performing clustering processing on the plurality of pieces of training information includes: performing clustering processing on the plurality of pieces of training information according to an ordering points to identify the clustering structure (OPTICS) algorithm.

Optionally, the terminal device has at least two operation modes, where in a first operation mode, the terminal device needs to identify whether the user is an owner, and in a second operation mode, the terminal device does not need to identify whether the user is the owner; and before the managing the terminal device based on a matching degree between the operation information corresponding to the first operation and a first decision model, the method further includes: determining that a current operation mode of the terminal device is the first operation mode.

According to a second aspect, a terminal device management method is provided, including: displaying a first interface; receiving a first operation of a user and obtaining operation information corresponding to the first operation, where the operation information includes touch information and/or posture information of a terminal device; displaying a second interface in response to the operation information corresponding to the first operation being of a first type, where the second interface is different from the first interface; and displaying a third interface in response to the operation information corresponding to the first operation being of a second type, and the second type is different from the first type.

The third interface includes a user verification interface, and the second interface is an interface obtained after verification succeeds.

"The operation information corresponding to the first operation is of a first type" herein may indicate that a matching degree between the operation information corresponding to the first operation and a first decision model is greater than a preset first threshold.

"The operation information corresponding to the first operation is of a second type" may indicate that the matching degree between the operation information corresponding to the first operation and the first decision model is less than the preset first threshold.

The first decision model may be determined based on operation information of an operation performed by an owner of the terminal device.

Optionally, the touch information includes at least one of the following information: information about a force of a touch operation, information about a position of the touch operation, information about a contact area of the touch operation, information about a contact time of the touch operation, information about a sliding angle of the touch operation, information about a sliding direction of the touch operation, or information about a sliding distance of the touch operation.

Optionally, the second interface is an interface of an application program.

The application program may be an application program to which the first interface belongs.

Alternatively, the application program may be an application program operated by the first operation.

Optionally, the method further includes: before the second interface is displayed, receiving a second operation of the user; in response to operation information corresponding to the second operation and the first operation being of the first type, displaying the second interface; and in response to the operation information corresponding to the second operation and the first operation being of the second type, displaying the third interface.

"Operation information corresponding to the second operation and the first operation is of the first type" herein may indicate that a matching degree between operation information corresponding to the second operation and the first decision model is greater than the preset first threshold, and the matching degree between the operation information corresponding to the first operation and the first decision model is greater than the preset first threshold.

"The operation information corresponding to the first operation and the first operation is of the second type" may indicate that the matching degree between the operation information corresponding to the second operation and the first decision model is less than the preset first threshold, and/or the matching degree between the operation information corresponding to the first operation and the first decision model is less than the preset first threshold.

Optionally, the method further includes: when the third interface is displayed, receiving a third operation of the user and obtaining operation information corresponding to the third operation; and in response to the operation information of the third operation being of a third type, displaying the second interface.

"The operation information of the third operation is of a third type" may indicate that a matching degree between the operation information corresponding to the third operation and the first decision model is greater than the preset first threshold, and unlocking information corresponding to the third operation meets an unlocking condition.

According to a third aspect, a user identification method is provided, including: determining a plurality of pieces of training information based on user operations detected in a first time period, where the user operations include operations performed by a plurality of users, and the training information includes touch operation information of the user operations and/or posture information of the terminal device during the user operations; performing clustering processing on the plurality of pieces of training information, to determine at least one training information set; determining, based on information about a first user of the plurality of users, a first training information set corresponding to the first user of the at least one training information set; determining a decision model for the first user based on training information in the first training information set; and when a first operation is detected in a second time period, determining, based on the decision model, whether a user that performs the first operation is the first user.

According to the user identification method in this application, because an operation of a user is habitual, a same user may generate a large quantity of similar operations in a process of operating the terminal device. The terminal device clusters the plurality of pieces of training information determined based on the user operations detected in the first time period, so that training information in a same training information set obtained after clustering corresponds to the same user, and a decision model generated based on the training information in the training information set can effectively decide whether a user that performs an operation is a user corresponding to the training information set. Therefore, to implement user identification, biometric feature recognition devices do not need to be additionally configured, to reduce costs of terminal devices. In addition, because a user operation of producing the training information does not need to be performed by the user intentionally, or in other words, an additional operation burden of the user does not need to be added to implement the user identification, user experience can be improved, and practicability of the user identification in this application can be improved.

Optionally, the performing clustering processing on the plurality of pieces of training information includes: performing clustering processing on the plurality of pieces of training information based on a preset first threshold, where density of training information in each training information set is greater than or equal to the first threshold; and the determining, based on information about a first user of the plurality of users, a first training information set corresponding to the first user of the plurality of training information sets includes: when the information about the first user indicates that the first user is an owner of the terminal device, determining a training information set having highest density of training information in the plurality of training information sets as the first training information set.

According to the user identification method in this application, because the owner operates the terminal device at a relatively high frequency, the owner performs a relatively large quantity of operations. By using a density-based clustering algorithm, the training information set having the highest density may be determined as a training information set used to train a decision model for identifying the owner, to easily identify the owner.

Optionally, clustering processing is performed on the plurality of pieces of training information according to an ordering points to identify the clustering structure (OPTICS) algorithm.

Optionally, the performing clustering processing on the plurality of pieces of training information, to determine a plurality of training information sets includes: performing clustering processing on the plurality of pieces of training information, to determine the plurality of training information sets and feature information corresponding to each training information set, where the plurality of training information sets are in a one-to-one correspondence with the plurality of users, and the feature information of each training information set is used to mark the user; and the determining, based on information about a first user of the plurality of users, a first training information set corresponding to the first user of the plurality of training information sets includes: when the information about the first user is feature information of the first user, determining a training information set in the plurality of training information sets as the first training information set, where similarity between feature information of the training information set and the feature information of the first user meets a second preset condition.

According to the user identification method in this application, the feature information corresponding to each training information set can be determined by clustering processing, so that a decision model for a plurality of users can be determined when feature information of the plurality of users can be obtained. Therefore, practicability of the user identification method in this application can be improved.

Optionally, the performing clustering processing on the plurality of pieces of training information includes: performing clustering processing on the plurality of pieces of training information according to a K-means algorithm.

Optionally, the determining a plurality of pieces of training information based on user operations detected in a first time period includes: determining the plurality of pieces of training information based on user operations that are detected in the first time period and that are for a first application; and when a first operation is detected in a second time period, the determining, based on the decision model, whether a user that performs the first operation is the first user includes: when the first operation for the first application is detected in the second time period, determining, based on the decision model, whether the user that performs the first operation is the first user.

Because similarity between operations performed by a same user on a same application may be relatively large, a decision model is determined by using training information determined based on an operation performed on the first application, and a user that performs an operation on the first application is decided by using the decision model, so that identification accuracy and reliability of the user identification method in this application can be improved.

Optionally, the determining a plurality of pieces of training information based on user operations detected in a first time period includes: determining the plurality of pieces of training information based on user operations that are detected in the first time period and that are for a first operation interface; and when a first operation is detected in a second time period, the determining, based on the decision model, whether a user that performs the first operation is the first user includes: when the first operation for the first operation interface is detected in the second time period, determining, based on the decision model, whether the user that performs the first operation is the first user.

Because similarity between operations performed by a same user on a same operation interface may be relatively large, a decision model is determined by using training information determined based on an operation performed on the first operation interface, and a user that performs an operation on the first operation interface is decided by using the decision model, so that identification accuracy and reliability of the user identification method in this application can be improved.

Optionally, the determining a plurality of pieces of training information based on user operations detected in a first time period includes: determining the plurality of pieces of training information based on user operations that are detected in the first time period and that are of a first operation type; and when a first operation is detected in a second time period, the determining, based on the decision model, whether a user that performs the first operation is the first user includes: when the first operation of the first operation type is detected in the second time period, determining, based on the decision model, whether the user that performs the first operation is the first user.

Optionally, the first operation type includes a sliding operation type, a tapping operation type, or a touching and holding operation type.

Because similarity between operations that are performed by a same user and that are of a same operation type may be relatively large, a decision model is determined by using training information determined based on an operation of the first operation type, and a user that performs an operation of the first operation type is decided by using the decision model, so that identification accuracy and reliability of the user identification method in this application can be improved.

Optionally, the touch operation information includes at least one of the following information: information about a force of a touch operation, information about a position of the touch operation, information about a contact area of the touch operation, information about a contact time of the touch operation, information about a sliding angle of the touch operation, information about a sliding direction of the touch operation, or information about a sliding distance of the touch operation.

Optionally, when the first user is the owner, after it is determined, based on the decision model and information of the first operation, that the user that performs the first operation is not the first user, the method further includes: forbidding (disabling) a target application specified in the terminal device; performing screen locking processing; or performing alarm processing.

Therefore, security of the terminal device can be improved.

Optionally, the terminal device has at least two operation modes, where in a first operation mode, the terminal device needs to identify whether the user is the owner, and in a second operation mode, the terminal device does not need to identify whether the user is the owner; and before it is determined, based on the decision model and information of the first operation, whether the user that performs the first operation is the first user, the method further includes: determining that a current operation mode of the terminal device is the first operation mode.

Therefore, flexibility and practicability of the user identification method in this application can be improved.

According to a fourth aspect, a user identification method is provided, including: receiving a plurality of pieces of training information sent by a terminal device, where the training information is determined based on user operations detected by the terminal device in a first time period, the user operations include operations performed by a plurality of users, and the training information includes touch operation information of the user operations and/or posture information of the terminal device during the user operations; performing clustering processing on the plurality of pieces of training information, to determine at least one training information set; determining, based on information about a first user of the plurality of users, a first training information set corresponding to the first user of the at least one training information set; determining a decision model for the first user based on training information in the first training information set; and when a first operation is detected in a second time period, sending the decision model to the terminal device, so that the terminal device determines, based on the decision model, whether a user that performs the first operation is the first user.

According to the user identification method in this application, because an operation of a user is habitual, a same user may generate a large quantity of similar operations in a process of operating the terminal device. The terminal device clusters the plurality of pieces of training information determined based on the user operations detected in the first time period, so that training information in a same training information set obtained after clustering corresponds to the same user, and a decision model generated based on the training information in the training information set can effectively decide whether a user that performs an operation is a user corresponding to the training information set. Therefore, to implement user identification, biometric feature recognition devices do not need to be additionally configured, to reduce costs of terminal devices. In addition, because a user operation of producing the training information does not need to be performed by the user intentionally, or in other words, an additional operation burden of the user does not need to be added to implement the user identification, user experience can be improved, and practicability of the user identification in this application can be improved. In addition, because a process of determining the decision model is performed by a server, a requirement on processing performance of the terminal device can be reduced, and processing load of the terminal device can be reduced. Therefore, practicability of the user identification method in this application can be further improved.

Optionally, the performing clustering processing on the plurality of pieces of training information includes: performing clustering processing on the plurality of pieces of training information based on a preset first threshold, where density of training information in each training information set is greater than or equal to the first threshold; and the determining, based on information about a first user of the plurality of users, a first training information set corresponding to the first user of the plurality of training information sets includes: when the information about the first user indicates that the first user is an owner of the terminal device, determining a training information set having highest density of training information in the plurality of training information sets as the first training information set.

Optionally, the performing clustering processing on the plurality of pieces of training information, to determine a plurality of training information sets includes: performing clustering processing on the plurality of pieces of training information, to determine the plurality of training information sets and feature information corresponding to each training information set, where the plurality of training information sets are in a one-to-one correspondence with the plurality of users, and the feature information of each training information set is used to mark the user; and the determining, based on information about a first user of the plurality of users, a first training information set corresponding to the first user of the plurality of training information sets includes: when the information about the first user is feature information of the first user, determining a training information set in the plurality of training information sets as the first training information set, where similarity between feature information of the training information set and the feature information of the first user meets a second preset condition.

Optionally, the receiving a plurality of pieces of training information sent by a terminal device includes: receiving the plurality of pieces of training information and a first indication that are sent by the terminal device, where the first indication information is used to indicate that the plurality of pieces of training information are determined based on user operations that are for a first application and that are detected by the terminal device in the first time period; and the sending the decision model to the terminal device includes: sending the decision model and second indication information to the terminal device, where the second indication information is used to indicate that the decision model is specifically used to decide whether a user that performs an operation on the first application is the first user.

Optionally, the receiving a plurality of pieces of training information sent by a terminal device includes: receiving the plurality of pieces of training information and third indication information that are sent by the terminal device, where the third indication information is used to indicate that the plurality of pieces of training information are determined based on user operations that are for a first operation interface and that are detected by the terminal device in the first time period; and the sending the decision model to the terminal device includes: sending the decision model and fourth indication information to the terminal device, where the fourth indication information is used to indicate that the decision model is specifically used to decide whether a user that performs an operation on the first operation interface is the first user.

Optionally, the receiving a plurality of pieces of training information sent by a terminal device includes: receiving the plurality of pieces of training information and fifth indication information that are sent by the terminal device, where the fifth indication information is used to indicate that the plurality of pieces of training information are determined based on user operations that are of a first operation type and that are detected by the terminal device in the first time period; and the sending the decision model to the terminal device includes: sending the decision model and sixth indication information to the terminal device, where the sixth indication information is used to indicate that the decision model is specifically used to decide whether a user that performs an operation of the first operation type is the first user.

Optionally, the first operation type includes a sliding operation type, a tapping operation type, or a touching and holding operation type.

Optionally, the touch operation information includes at least one of the following information: information about a force of a touch operation, information about a position of the touch operation, information about a contact area of the touch operation, information about a contact time of the touch operation, information about a sliding angle of the touch operation, information about a sliding direction of the touch operation, or information about a sliding distance of the touch operation.

According to a fifth aspect, a terminal device management apparatus is provided, and includes units configured to perform the steps in the method according to any one of the foregoing first to third aspects and the implementations of any one of the foregoing first to third aspects.

The terminal device management apparatus may be configured in a terminal device. In this case, a detection unit in the terminal device management apparatus may be implemented by using a sensor in the terminal device. A processing unit in the user identification apparatus may be independent of a processor in the terminal device. Alternatively, the processing unit in the terminal device management apparatus may be implemented by using the processor in the terminal device.

Alternatively, the terminal device management apparatus may be the terminal device.

According to a sixth aspect, a user identification apparatus is provided, and includes units configured to perform the steps in the method according to the foregoing fourth aspect and the implementations of the foregoing fourth aspect.

The user identification apparatus may be configured in a server that can communicate with a terminal device. In this case, a processing unit in the user identification apparatus may be independent of a processor in the server. Alternatively, a processing unit in the user identification apparatus may be implemented by using a processor in the server.

Alternatively, the user identification apparatus may be the server.

According to a seventh aspect, a terminal device is provided, and includes a sensor, a processor, and a memory.

The sensor is configured to detect a user operation and/or a posture of the terminal device, the memory is configured to store a computer program, and the processor is configured to invoke the computer program from the memory and run the computer program, so that the communications device performs the method according to any one of the first to third aspects and the possible implementations of the first to third aspects.

Optionally, there are one or more processors and one or more memories.

Optionally, the memory may be integrated with the processor, or the memory and the processor are separately disposed.

Optionally, there may be one or more sensors. The one or more sensors may jointly detect a same parameter, or different sensors may be configured to detect different parameters.

Optionally, the terminal device may further include a transmitter (transmitter) and a receiver.

According to an eighth aspect, a server is provided, and includes a processor, a memory, a transmitter, and a receiver. The memory is configured to store a computer program, and the processor is configured to invoke the computer program from the memory and run the computer program, so that the communications device performs the user identification method according to the fourth aspect and the implementations of the fourth aspect.

Optionally, there are one or more processors and one or more memories.

Optionally, the memory may be integrated with the processor, or the memory and the processor are separately disposed.

According to a ninth aspect, a computer program product is provided. The computer program product includes a computer program (which may also be referred to as code or an instruction), and when run, the computer program enables a computer to perform the method according to any one of the foregoing first to fourth aspects and the possible implementations of the foregoing first to fourth aspects.

According to a tenth aspect, a computer-readable medium is provided. The computer-readable medium stores a computer program (which may also be referred to as code or an instruction), and when run on a computer, the computer program enables the computer to perform the method according to any one of the foregoing first to fourth aspects and the implementations of the foregoing first to fourth aspects.

According to an eleventh aspect, a chip system is provided, and includes a memory and a processor. The memory is configured to store a computer program, and the processor is configured to invoke the computer program from the memory and run the computer program, so that a device provided with the chip system performs the method according to any one of the foregoing first to fourth aspects and the implementations of the foregoing first to fourth aspects.

For example, the chip system may invoke data collected by a sensor of a terminal device, and generate a decision model based on related steps in the method according to any one of the possible implementations of the foregoing first and second aspects.

The chip system may include an input circuit or interface configured to send information or data, and an output circuit or interface configured to receive information or data.

Because an operation of a user is habitual, a same user (namely, a first user) may generate a large quantity of similar operations in a process of operating the terminal device, so that based on the technology in this application, training is performed by using a plurality of operations of the first user, and a decision model is obtained. Based on the decision model, it can be decided whether an operation is performed by the first user. Therefore, use security of the terminal device can be improved.

DESCRIPTION OF EMBODIMENTS

Figure 1:
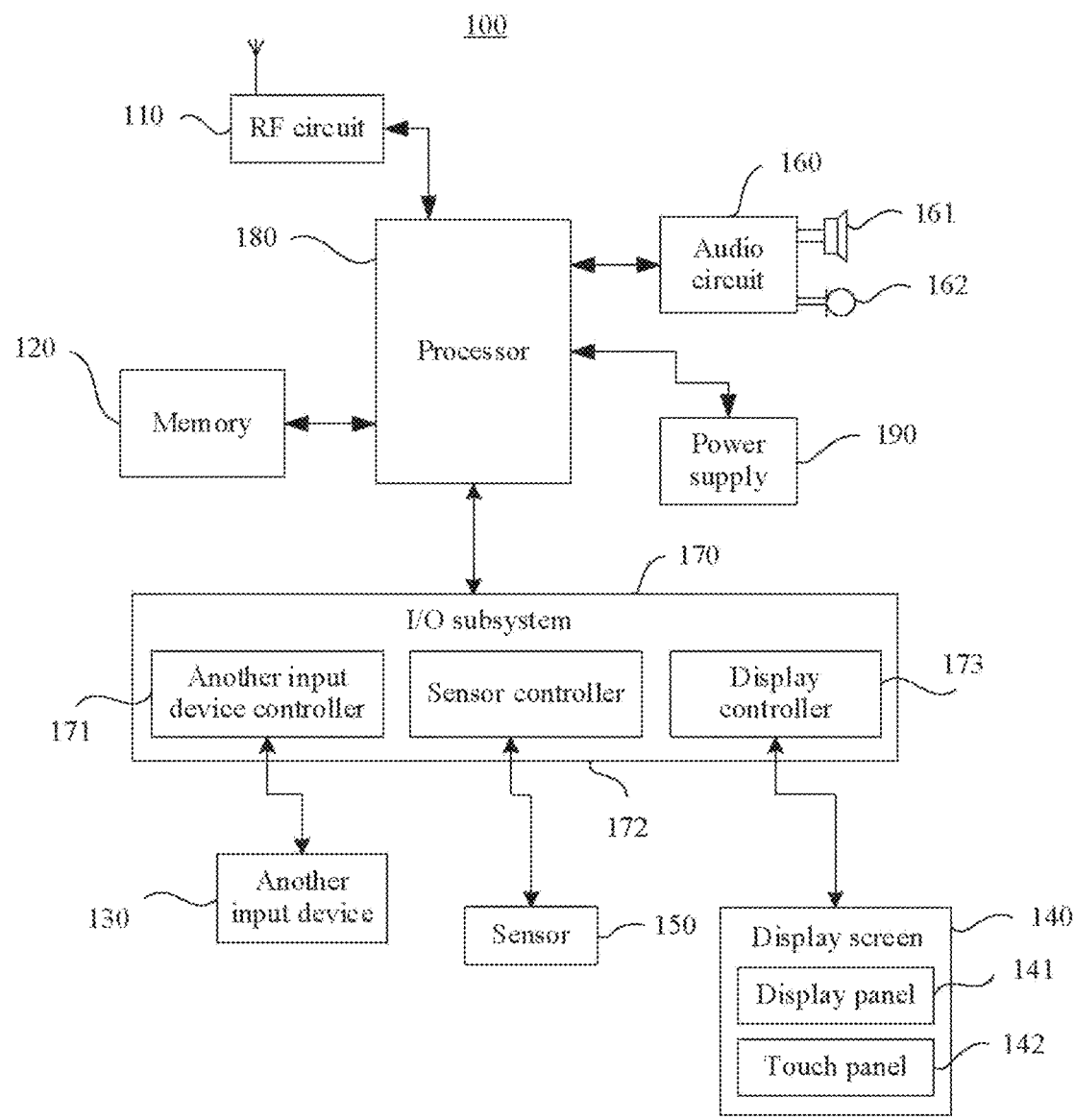
FIG. 1 is a schematic diagram of an example of a terminal device to which a terminal device management method in this application is applicable.

The following describes technical solutions of this application with reference to accompanying drawings. "A plurality of" refers to two or more than two of something. The terms "and/or", "at least one of . . . or . . . " and "at least one of . . . and . . . " describe an association relationship between associated objects and indicate that any of three relationships may exist. For example, only A exists, both A and B exist, and only B exists.

A user identification method in this application may be applied to user identification of a terminal device. The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may be a station (ST) in a WLAN, or may be a cellular phone, a cordless phone, a session initiation protocol (SIP) phone, a wireless local loop (WLL) station, a personal digital assistant (PDA) device, devices having a wireless communication function such as a handheld device, a computing device, or another processing device connected to a wireless modem, an vehicle-mounted device, an Internet of Vehicles terminal, a computer, a laptop computer, a handheld communications device, a handheld computing device, a satellite wireless device, a wireless modem card, a set-top box (STB), customer premise equipment (CPE), and/or other devices configured to communicate on a wireless system and a next generation communications system, for example, a terminal device in a 5G network or a terminal device in a future evolved public land mobile network (PLMN) network.

By way of example, and not limitation, in this embodiment of this application, the terminal device may alternatively be a wearable device. A wearable device may also be referred to as a wearable intelligent device, and is a general term of wearable devices, such as glasses, gloves, watches, clothes, and shoes, that are developed by applying wearable technologies in intelligent designs of daily wear. The wearable device is a portable device that can be directly worn on a body or integrated into clothes or an accessory of a user. The wearable device is not merely a hardware device, and is further used to implement a powerful function by using software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as smartphones, for example, various smart bands or smart jewelry for monitoring physical signs.

In addition, in the embodiments of this application, the terminal device may alternatively be a terminal device in an Internet of Things (IoT) system. IoT is an important part of future development of information technologies, and a main technical feature of IoT is to connect a thing to a network by using a communications technology, thereby implementing an intelligent network for interconnection between a person and a machine or between one thing and another.

FIG. 1 is a schematic diagram of an example of the terminal device. As shown in FIG. 1, the terminal device 100 may include the following components.

A RF Circuit 110

The RF circuit 110 may be configured to receive and send information, or receive and send signals during a call, and particularly, receive downlink information from a base station, and then send the downlink information to a processor 180 for processing. In addition, the RE circuit 110 sends related uplink data to the base station. Usually, an RF circuit includes but is not limited to an antenna, at least one amplifier, a transceiver, a coupler, a low noise amplifier (LNA) and a duplexer. In addition, the RF circuit 110 may further communicate with a network and another device by using wireless communication. The wireless communication may use any communications standard or protocol, including but not limited to a wireless local area network (WLAN) global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunications system (UMTS), a Worldwide Interoperability for Microwave Access (WiMAX) communications system, a future 5th Generation (5G) system, or new radio (NR).

B. Memory 120

The memory 120 may be configured to store a software program and a module, and the processor 180 runs the software program and the module that are stored in the memory 120, to perform various functional applications of the terminal device 100 and data processing. The memory 120 may mainly include a program storage area and a data storage area. The program storage area may store an operating system, an application program required by at least one function (such as a sound playback function and an image display function), and the like. The data storage area may store data (such as audio data and a phone book) created based on use of the terminal device 100, and the like. In addition, the memory 120 may include a high-speed random access memory, and may further include a non-volatile memory, for example, at least one magnetic disk storage device, a flash memory, or another volatile solid-state storage device.

C. Another Input Device 130

The another input device 130 may be configured to receive input digit or character information, and generate a key signal input related to user setting and function control of the terminal device 100. Specifically, the another input device 130 may include but is not limited to one or more of a physical keyboard, a function key (for example, a volume control key or an on/off key), a trackball, a mouse, a joystick, an optical mouse (the optical mouse is a touch-sensitive surface that does not display a visual output, or is an extension of a touch-sensitive surface formed by a touchscreen and the like. The another input device 130 is connected to another input device controller 171 of an I/O subsystem 170, and perform signal exchange with the processor 180 under control of the another input device controller 171.

D. Display Screen 140

The display screen 140 may be configured to display information input by a user or information provided to a user and various menus on the terminal device 100, and may further accept user input. Specifically, the display screen 140 may include a display panel 141 and a touch panel 142. The display panel 141 may be configured by using a liquid crystal display (LCD), an organic light-emitting diode (OLED), or the like. The touch panel 142 is also referred to as a touchscreen, a touch-sensitive screen, or the like. The touch panel 142 may collect a touch or non-touch operation of a user on or around the touch panel 142 (for example, an operation performed on the touch panel 142 or around the touch panel 142 by a user by using a finger or any proper object or accessory such as a stylus, where the operation may include a motion sensing operation, and the operation includes operation types such as a single-point control operation and a multi-point control operation), and drives a corresponding connection apparatus based on a preset program. Optionally, the touch panel 142 may include two parts: a touch detection apparatus and a touch controller. The touch detection apparatus detects a touch position and a gesture of the user, detects a signal generated by the touch operation, and transfers the signal to the touch controller. The touch controller receives touch information from the touch detection apparatus, converts the touch information into information that can be processed by the processor and then sends the information to the processor 180, and can receive a command sent by the processor 180 and execute the command. In addition, the touch panel 142 may be implemented in a plurality of types such as a resistive type, a capacitive type, an infrared type, and a surface acoustic wave type; or the touch panel 142 may be implemented by using any technology to be developed in the future. Further, the touch panel 142 may cover the display panel 141. The user may perform, based on content displayed on the display panel 141 (the displayed content includes but is not limited to a soft keyboard, a virtual mouse, a virtual key, an icon, and the like), an operation on or near the touch panel 142 that covers the display panel 141. After detecting the operation on or near the touch panel 142, the touch panel 142 sends the operation to the processor 180 by using the I/O subsystem 170 to determine user input. Then, the processor 180 provides, based on the user input, corresponding visual output on the display panel 141 by using the I/O subsystem 170. Although in FIG. 4, the touch panel 142 and the display panel 141 are used as two separate parts to implement input and output functions of the terminal device 100, in some embodiments, the touch panel 142 and the display panel 141 may be integrated to implement the input and output functions of the terminal device 100.

E. Sensor 150

The sensor 150 may be one or more sensors. For example, the sensor 150 may include a light sensor, a motion sensor, and another sensor.

Specifically, the optical sensor may include an ambient light sensor and a proximity sensor. The ambient light sensor may adjust luminance of the display panel 141 based on brightness of ambient light. The proximity sensor may switch oft the display panel 141 and/or backlight when the terminal device 100 is moved to the ear.

As one type of motion sensor, an acceleration sensor may detect magnitude of accelerations at various directions (usually on three axes), may detect magnitude and a direction of gravity when static, and may be configured to identify an application of a gesture of the terminal device (such as landscape-to-portrait switch, a related game, or magnetometer posture calibration), a related function of vibration identification (such as a pedometer or a knock), and the like.

In addition, other sensors such as a gravity sensor, a barometer, a hygrometer, a thermometer, and an infrared sensor that may be further configured in the terminal device 100 are not described in detail herein.

F. Audio Circuit 160, Speaker 161, and Microphone 162

An audio interface between the user and the terminal device 100 may be provided.

The audio circuit 160 may convert received audio data into a signal and transmit the signal to the speaker 161. The speaker 161 converts the signal into a sound signal for output. On the other hand, the microphone 162 converts a collected sound signal into a signal. The audio circuit 160 receives the signal and converts the signal into audio data, and outputs the audio data to the RF circuit 108 to send the audio data to, for example, another terminal device, or outputs the audio data to the memory 120 for further processing.

G. I/O Subsystem 170

The I/O subsystem 170 is configured to control an external input and output device, and may include the another input device controller 171, a sensor controller 172, and a display controller 173. Optionally, one or more another input device controllers 171 receive a signal from the another input device 130 and/or send a signal to the another input device 130. The another input device 130 may include a physical button (a pressing button, a rocker button, and the like), a dial pad, a slider switch, a joystick, a click scroll wheel, or the optical mouse (the optical mouse is the touch-sensitive surface that does not display the visual output, or the extension of the touch-sensitive surface formed by the touchscreen). It should be noted that the another input device controller 171 may be connected to any one of or a plurality of the foregoing devices. The display controller 173 in the I/O subsystem 170 receives a signal from the display screen 140, and/or sends a signal to the display screen 140. After the display screen 140 detects the user input, the display controller 173 converts the detected user input into interaction with a user interface object displayed on the display screen 140. In other words, man-machine interaction is implemented. The sensor controller 172 may receive a signal from one or more sensors 150, and/or send a signal to one or more sensors 150.

H. Processor 180

The processor 180 is a control center of the terminal device 100, and connects to various parts of the entire terminal device by using various interfaces and lines. By running or executing the software program and/or the module that are/is stored in the memory 120, and invoking data stored in the memory 120, the processor 180 performs various functions and data processing of the terminal device 100, thereby performing overall monitoring on the terminal device. Optionally, the processor 180 may include one or more processing units. Preferably, an application processor and a modem processor may be integrated into the processor 180. The application processor mainly processes an operating system, a user interface, an application program, and the like. The modem processor mainly processes wireless communication. It may be understood that the foregoing modern processor may not be integrated into the processor 180.

The terminal device 100 further includes a power supply 190 (for example, a battery) that supplies power for various components. Preferably, the power supply may be logically connected to the processor 180 by using a power management system, to implement a function such as charging, discharging and power consumption management by using the power management system.

In addition, although not shown in the figure, the terminal device 100 may further include a camera, a Bluetooth module, and the like, which are not described in detail herein.

Figure 2:
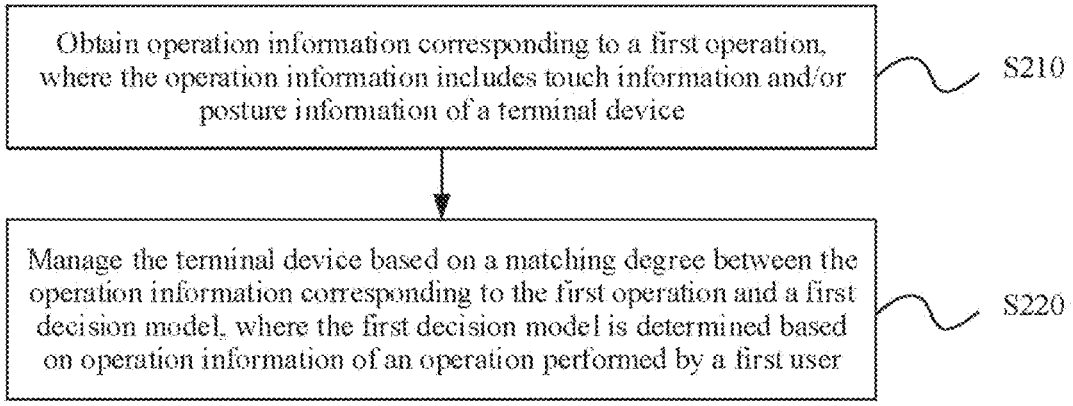
FIG. 2 is a schematic flowchart of an example of a terminal device management method in this application.

FIG. 2 shows description of an example of a terminal device management method 200 in this application. For example, the method 200 may be applied to the foregoing terminal device 100.

As shown in FIG. 2, in S210, a processor (for example, the foregoing processor 180) of the terminal device may obtain related data of a user operation #1.

For example, when a sensor (for example, a touchscreen or a posture sensor) detects data #1 generated based on a user operation #1, the sensor may send the data #1 to the processor.

First, an execution occasion of the method 200 in this application, namely, an occasion for performing S210, is described.

By way of example, and not limitation, execution of the method 200 may be triggered in any one of the following manners.

Manner 1: Triggered Periodically

Specifically, the terminal device may detect an identity of a user of the terminal device based on a specified detection periodicity, or determine a matching degree between user operations detected in a current periodicity and a decision model (which is subsequently described in detail). In this case, the user operation #1 may be one or more detected operations in the current detection periodicity.

Manner 2: Triggered Based on Duration in which the Terminal Device is Operated

Specifically, the terminal device may record duration in which the terminal device is operated consecutively. The duration in which the terminal device is operated consecutively may indicate that a time interval between any two operations in the duration is less than or equal to a preset time interval. Therefore, the terminal device may start the method 200 when determining that the duration in which the terminal device is operated consecutively is greater than or equal to preset duration. In this case, the user operation #1 may be one or more operations detected after the terminal device determines that the duration in which the terminal device is operated consecutively is greater than or equal to the preset duration.

Manner 3: Triggered Based on an Operated Application

Specifically, the terminal device may determine a currently operated application, and if the application is a specified application (for example, a chat application or a payment application), the terminal device may start the method 200. In this case, the user operation may be a touch operation for a specified application program.

The following describes the "user operation #1".

By way of example, and not limitation, the user operation #1 may be any one of the following operations.

A. Screen unlocking operation. Specifically, to prevent a misoperation and improve security of the terminal device, a user may lock a screen, or the terminal device may automatically lock the screen if the terminal device does not detect an operation performed by the user on the terminal device within a specified time, so that when the user needs to unlock the screen, the user needs to perform a correct unlocking operation, and for example, various unlocking operations such as sliding unlocking, password unlocking, or pattern unlocking may be listed.

B. Application unlocking operation. Specifically, to improve the security of the terminal device, when the user needs to open an application (for example, a chat application or a payment application), an unlock interface is popped up on the terminal device or the application, so that the application may be normally started after the user performs a correct unlocking operation. Alternatively, when the user needs to use a function (for example, a transfer function or a query function) of the application, an unlock interface may also be popped up on the terminal device or the application, so that the function can be normally enabled after the user performs a correct unlocking operation.

C. Touch operation for a specified application program. For example, by way of example, and not limitation, the specified application program may be an application program set by the user, for example, a chat application or a payment application. Alternatively, the specified application program may be an application program set by a manufacturer, an operator, or the like.

"A touch operation for a specified application program" may be an operation performed on a specified interface of the application program. For example, the operation may include an operation performed on a specified interface control (for example, a tapping operation on a payment button). For another example, the operation may include an operation set by the user, for example, a sliding operation performed on a browsing interface to implement page turning.

Alternatively, "a touch operation for a specified application program" may be an operation of managing the application program, and for example, may include an operation of deletion, permission change, or the like on the application program.

It should be understood that specific content included in the user operation #1 listed above is merely used as an example for description, and this application is not limited thereto. The user may set specific content of the user operation #1 randomly as required. For example, the user operation #1 may alternatively be determined with reference to the foregoing triggering manners.

The following describes "related data" in detail.

By way of example, and not limitation, in this embodiment of the present invention, the user operation may include a touch operation. In this case, related data of the touch operation performed by the user on a touchscreen may include related data of the touch operation performed by the user on the touchscreen. Alternatively, related data of the touch operation performed by the user on a touchscreen may include related data of a posture of the terminal device when the user performs an operation on the terminal device. The following separately describes the two types of data in detail.

1. Related data of a touch operation performed by a user on a touchscreen.

In other words, the user operation #1 may be a touch operation. In this case, related data of the user operation #1 may be data of the touch operation.

By way of example, and not limitation, the foregoing touch detection apparatus may detect the data of the touch operation performed by the user. By way of example, and not limitation, the touch operation may include but is not limited to a tapping (for example, tapping or double-tapping) operation, a sliding operation (for example, single-finger sliding or multi-finger sliding), or the like, and the data of the touch operation may include but is not limited to data of at least one of the following parameters.

a. Force of the Touch Operation

For example, a pressure sensor may be disposed under the touchscreen of the terminal device, so that the force of the touch operation may be detected, and data of the detected force is sent to the foregoing processor.

It should be understood that the foregoing manner of detecting the force of the touch operation is merely an example for description, and the present invention is not limited thereto. For example, the touchscreen may replace the pressure sensor. For example, the touchscreen may be a pressure screen, or a pressure sensing screen.

b. Position of the Touch Operation

For example, the position of the touch operation may be a relative position of a touch area of the touchscreen on the entire touchscreen. When the touch operation is a tapping operation, the position of the touch operation may be a position of a touch point on the screen. When the touch operation is a sliding operation, the position of the touch operation may include a position of a start point of the sliding operation on the screen, may include a position of an end point of the sliding operation on the screen, or may include a position of a sliding track on the screen.

c. Contact Area of the Touch Operation

For example, the contact area of the touch operation may be a contact area that is between the touchscreen and a finger of the user and that is detected by the touch detection apparatus.

d. Contact Time of the Touch Operation

For example, the contact time of the touch operation may be a time of one touch operation detected by the touch detection apparatus, where "one touch operation" may be an operation performed from a time at which a finger touches the touchscreen to a time at which the finger leaves the touchscreen. For example, when the touch operation is a tapping operation, the contact time of the touch operation may be a time in which the touchscreen is touched in one tapping operation. For another example, when the touch operation is a sliding operation, the contact time of the touch operation may be a time in which the touchscreen is touched in one sliding operation.

Alternatively, the contact time of the touch operation may be a time of a plurality of touch operations, where an interval that is of the time and that is detected by the touch detection apparatus is less than or equal to a preset time interval. For example, when the touch operation is an operation during which a finger leaves the touchscreen, such as a double-tapping operation, the contact time of the touch operation may be a total time of touching the touchscreen in one operation process.

e. Sliding Angle of the Sliding Operation

For example, the angle of the sliding operation may be an angle between a horizontal (or vertical) direction of the screen and a connection line between a start position of the sliding operation and an end position of the sliding operation.

f. Sliding Direction of the Sliding Operation

For example, the angle of the sliding operation may be a direction from the start position of the sliding operation to the end position of the sliding operation.

g. Sliding Distance of the Sliding Operation

For example, the sliding distance of the sliding operation may be a straight line length from the start position of the sliding operation to the end position of the sliding operation. Alternatively, the sliding distance of the sliding operation may be a total length of a track of the sliding operation.

It should be understood that a specific example and an obtaining manner of the foregoing parameters are merely examples for description. This is not particularly limited in this application. Data of or information about the foregoing parameters may be obtained by using various manners provided in the prior art.

2. Related data (namely, an example of posture information) of the posture that the terminal device has when the user performs an operation on the terminal device (for example, performs a touch operation on the touchscreen).

For example, the related data of the posture of the terminal device may include data of an angle between the terminal device and a horizontal direction or a gravity direction.

By way of example, and not limitation, the posture information may include but is not limited to data detected by at least one of the following sensors: a gravity sensor, an acceleration sensor, or a gyroscope.

In S220, the processor for example, the foregoing processor 180) of the terminal device may manage the terminal device based on one or more decision models and the related data of the user operation #1.

First, a decision model is described in detail.

Because different users have different operation habits and biological features, operations of different users may have different features.

For example, sizes of fingers of different users are different, and consequently touch contact areas of touch operations of different users may be different.

For another example, hand sizes of different users are different, and consequently sliding distances of sliding operations of different users may be different.

For another example, operation habits of different users are different, and consequently sliding directions, angles, or distances of sliding operations of different users may be different.

For another example, operation habits of different users are different, and consequently touch times or touch forces of touch operations of different users may be different.

For another example, operation habits of different users are different, and consequently postures (for example, tilt angles) that the terminal device has when different users perform operations on the terminal device may be different.

In addition, affected by an operation habit and a biometric feature of the user, data that is of operations performed by a same user and that is detected by the sensor is similar.

For example, similarity between touch contact areas of touch operations of a same user is relatively high.

For another example, similarity between sliding distances of sliding operations of a same user is relatively high.

For another example, similarity between sliding directions, angles, or distances of sliding operations of a same user is relatively high.

For another example, similarity between touch times or touch forces of touch operations of a same user is relatively high.

For another example, similarity between postures (for example, tilt angles) that the terminal device has when a same user performs operations on the terminal device is relatively high.

Therefore, training may be performed based on data of a same user, to determine a decision model for the user.

In other words, the decision model may be used to decide whether a user operation is an operation performed by a user corresponding to the decision model.

Subsequently, a training process of the decision model and a method for using the decision model are described in detail with reference to FIG. 3.

By way of example, and not limitation, in this embodiment of this application, the related data of the user operation #1 and the one or more decision models may be used by using at least one of the following methods.

Method 1

In this embodiment of this application, the terminal device may store a decision model #1. Specifically, the decision model #1 may be a model used to decide whether a user operation is an operation performed by an owner of the terminal device, in other words, the decision model may be a model generated after pre-training is performed based on an operation performed by the owner.

In this case, the processor may determine, based on the data of the user operation #1 and the decision model #1, whether the user that performs the user operation #1 is the owner.

For example, if a difference degree (for example, an absolute value of a difference) between a value of each dimension of data #1 and a value of each dimension of the decision model #1 is less than or equal to a specified threshold 4c, the processor may determine that the user that performs the user operation #1 is the owner.

Alternatively, if a difference degree (for example, an absolute value of a difference) between each value of Y dimensions in X dimensions of data #1 and each value of Y dimensions in X dimensions of the decision model #1 is less than or equal to a specified threshold #c, the processor may determine that the user that performs the user operation #1 is the owner. Y is less than or equal to X, and a ratio of Y to X is greater than or equal to a specified threshold #d.

On the contrary, for example, if the difference degree (for example, the absolute value of the difference) between the value of each dimension of data #1 and the value of each dimension of the decision model #1 is greater than the specified threshold the processor may determine that the user that performs the user operation #1 is not the owner.

Alternatively, if the difference degree (for example, the absolute value of the difference) between each value of the Y dimensions in the X dimensions of the data #1 and each value of the Y dimensions in the X dimensions of the decision model #1 is greater than the specified threshold #c, the processor may determine that the user that performs the user operation #1 is not the owner. Y is less than or equal to X, and the ratio of Y to X is greater than or equal to the specified threshold #d.

As described above, there may be a case (namely, a case 1) in which the user that performs the user operation #1 is the owner, or a case (namely, a case 2) in which the user that performs the user operation #1 is not the owner. In the following, decision is performed separately for the two cases.

Case 1

In this case, the processor may allow execution of processing corresponding to the user operation #1.

For example, if the user operation #1 is an operation used to start an application program #1, the processor may start the application program #1.

For another example, if the user operation #1 is an operation used to switch a current interface to an interface #1, the processor may switch the current interface to the interface #1. For example, the user operation #1 may be a screen unlocking operation. In this case, if it is decided that the user that performs the user operation #1 is the owner, the processor may control the terminal device to present an interface that needs to be presented after the screen is unlocked.

For another example, if the user operation #1 is an operation used to perform a function #1 (for example, transferring, paying, making a call, or receiving and sending information), the processor may control the terminal device to perform the function #1.

Alternatively, in this case, the processor may unlock a specified application program. For example, when the method 200 is started in the foregoing manner 1 or manner 2, if it is decided that the user that performs the user operation #1 is the owner, when an operation of starting an application program #X (not the user operation #1) is detected, the application program #X may be directly started. The application program #X may be an application that allows to be started after being unlocked (for example, after a password (for example, a fingerprint password, a numerical password, or a pattern password) is entered and the password is correct). According to the solution of this application, when it is decided that the user that performs the user operation #1 is the owner, an unlocking process for the application program #X may not need to be performed. For example, an interface of the application program #X may be directly displayed without popping up a password entering interface.

Case 2 in this case, the processor may forbid processing corresponding to the user operation #1.

For example, if the user operation #1 is an operation used to start an application program #1, the processor may forbid starting the application program #1. In addition, optionally, the processor may lock the terminal device, to be specific, the terminal device can continue to be used only after the terminal device is unlocked again.

For another example, if the user operation #1 is an operation used to switch a current interface to an interface #1, the processor may forbid switching the current interface to the interface #1. For example, the user operation #1 may be a screen unlocking operation. In this case, if it is decided that the user that performs the user operation #1 is not the owner, the processor may control the terminal device to enable the current interface to remain as the screen lock interface.

For another example, if the user operation #1 is an operation used to perform a function #1 (for example, transferring, paying, making a call, or receiving and sending information), the processor may forbid the terminal device to perform the function #1. In addition, optionally, the processor may lock the terminal device, to be specific, the terminal device can continue to be used only after the terminal device is unlocked again.

Alternatively, in this case, the processor may lock a specified application program. For example, when the method 200 is started in the foregoing manner 1 or manner 2, if it is decided that the user that performs the user operation #1 is the owner, when an operation of starting an application program #X (not the user operation #1) is detected, the application program #X may be directly locked. The application program ∩X may be an application that allows to be started after being unlocked (for example, after a password (for example, a fingerprint password, a numerical password, or a pattern password) is entered and the password is correct). Alternatively, the application program #X may be an application that allows to be started without being unlocked. According to the solution of this application, when it is decided that the user that performs the user operation #1 is not the owner, the application program #X is immediately locked. In other words, even if the operation used to start the application program #X is detected, the application program #X is not started.

It should be understood that the processing manners listed above are merely examples for description, and the present invention is not limited thereto. All other processing manners that can ensure use security of the terminal device and privacy or property security of the owner fall within the protection scope of the present invention.

It should be understood that the processing process listed above in manner 2 is only an example for description, and this application is not limited thereto. This application may be further applied to any one of the following scenarios.

A. Application Lock Function

Specifically, when a decision result is that a detected user operation is not performed by the owner, one or more specified applications may be locked. For example, the user is forbidden to operate the application, or running of the application is forbidden.

By way of example, and not limitation, the application may be an application that can implement a payment function or a consumption function. Therefore, a property loss of the owner due to an operation performed on a terminal by a user other than the owner can be avoided. Alternatively, the application may be an application set by the owner, so that it can be ensured that privacy of the owner is not leaked.

B. Anti-Theft Function

Specifically, if the decision result is that the detected user operation is not performed by the owner, the anti-theft function may be enabled.

As a method for implementing the anti-theft function, at least one of the following actions may be used:

1. powering off a phone; or
2. sending an alert to an operator or the police, where the alert may carry current location information of the terminal device.

It should be understood that the actions of the anti-theft function that are listed above are only examples for description, and the present invention is not limited thereto.

C. Screen Lock Function

Figure 4:
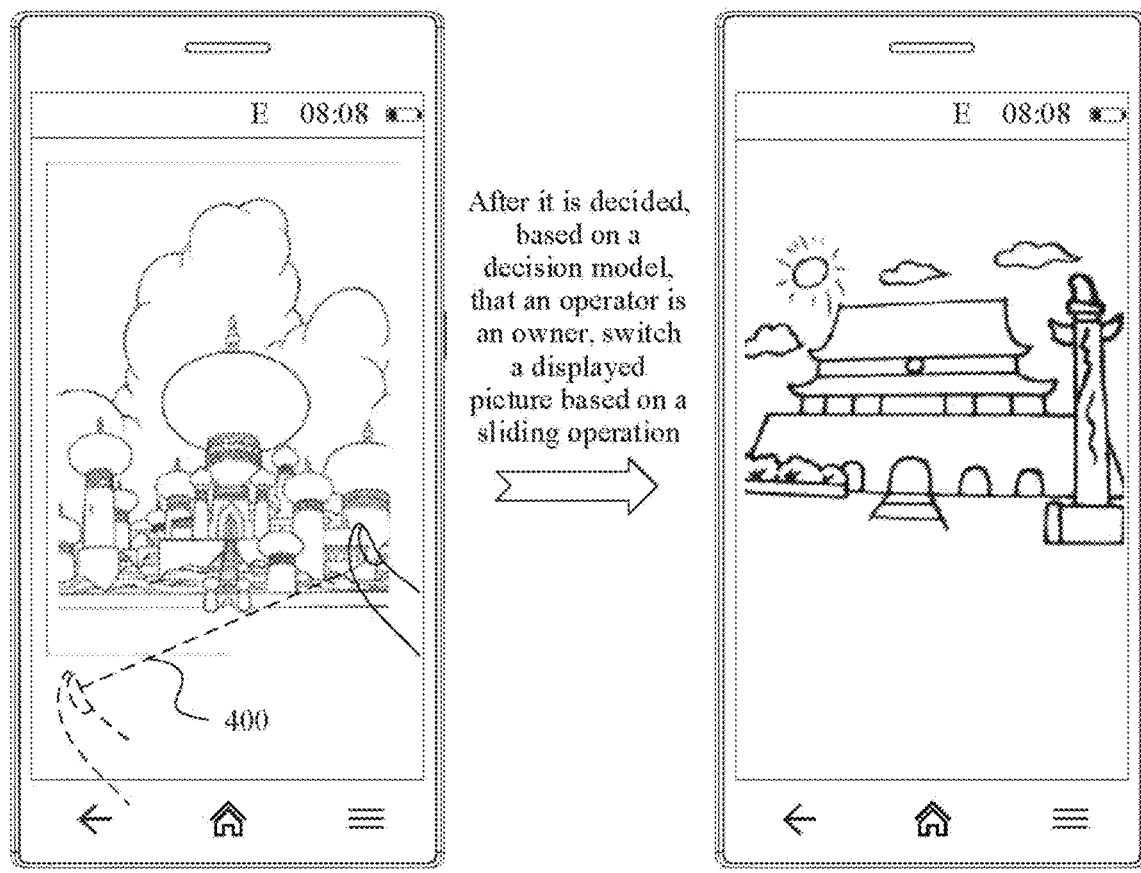
FIG. 4 is a schematic diagram of an example of interface control implemented according to a terminal device management method in this application.

Specifically, as shown in FIG. 4, if the decision result is that the detected user operation is performed by the owner, enabling the screen lock function may be forbidden.

Figure 5:
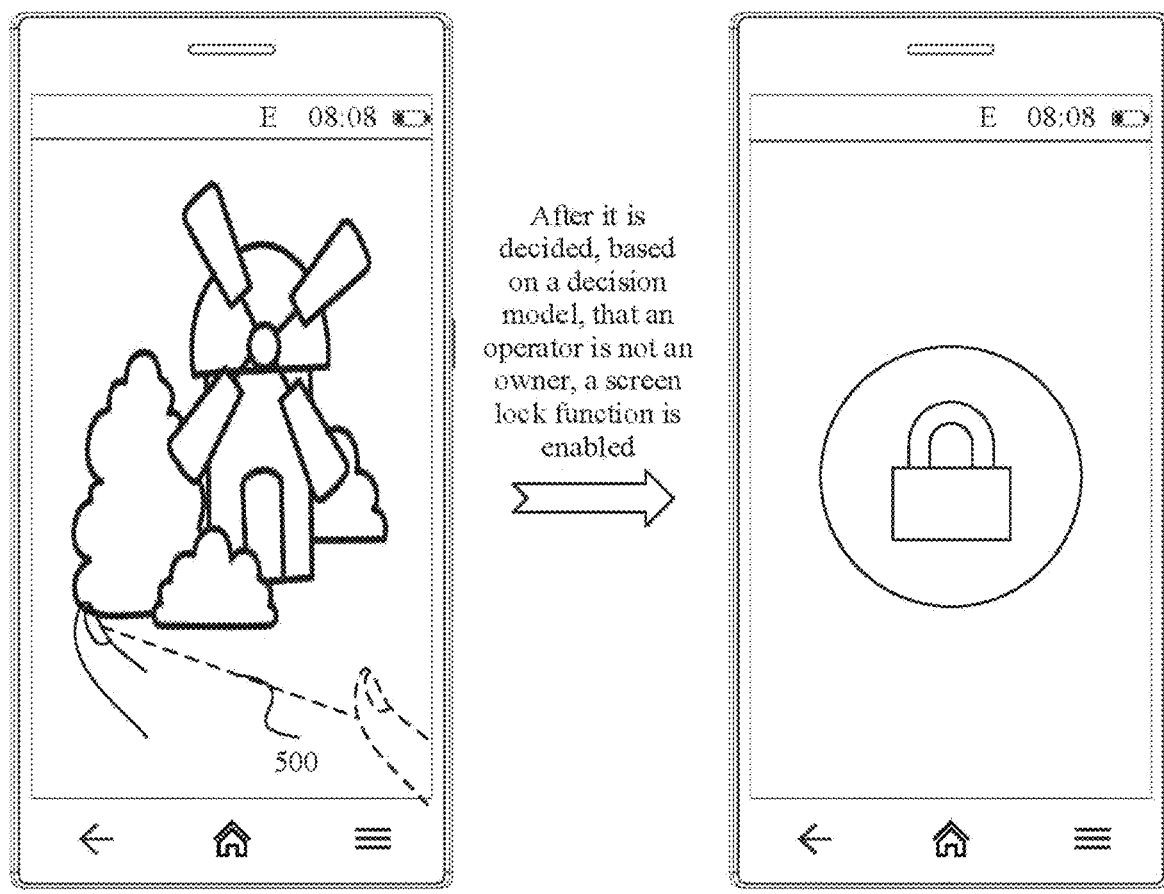
FIG. 5 is a schematic diagram of another example of interface control implemented according to a terminal device management method in this application.

On the contrary, as shown in FIG. 5, if the decision result is that the detected user operation is not performed by the owner, a display interface of the terminal device may be switched to a screen lock interface, and the terminal device can be normally used only after the user correctly unlocks the screen.

Figure 3:
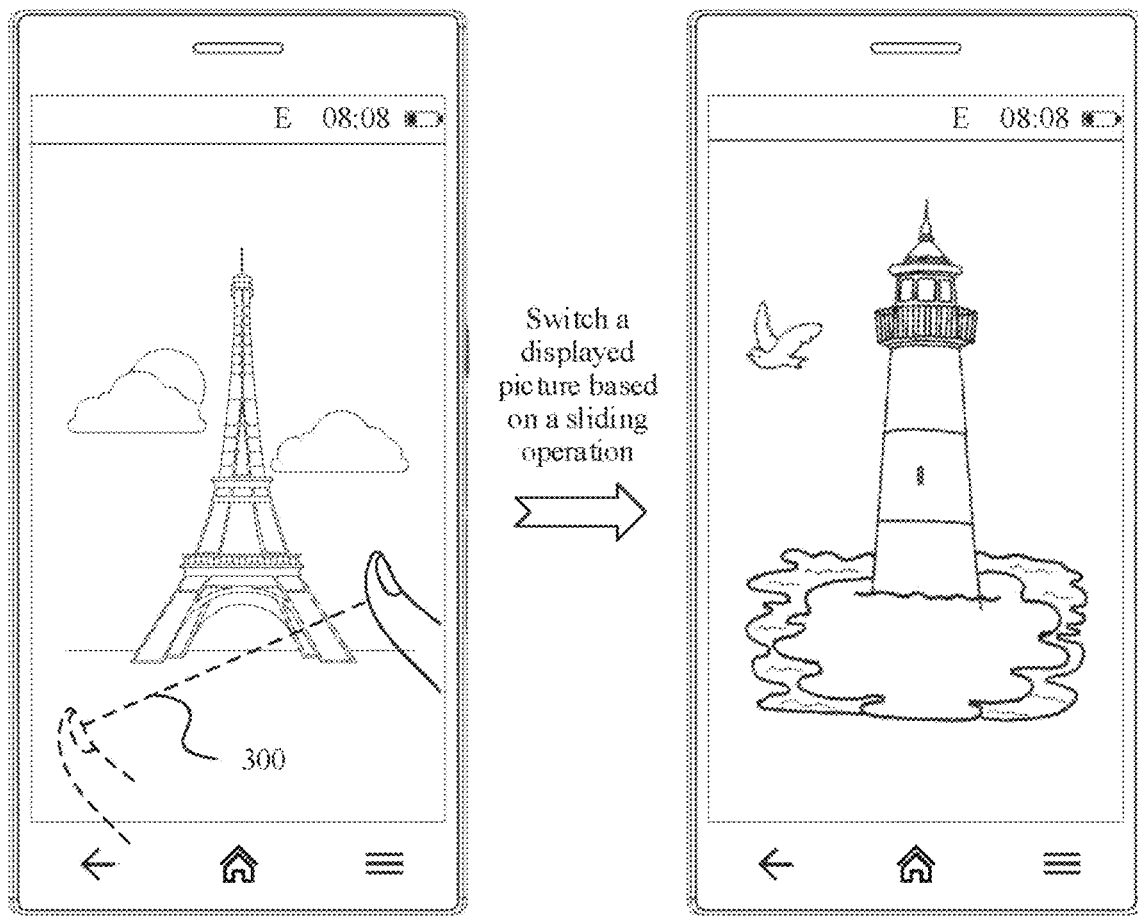
FIG. 3 is a schematic diagram of an example of a user operation corresponding to a decision model.

Specifically, as shown in FIG. 3, the decision model may be determined based on a sliding operation performed on a picture in a time period #A. In addition, FIG. 3 shows an example of a track 300 of a habitual sliding operation of the owner.

As shown in FIG. 4, when the owner browses a picture and performs a sliding operation (as shown in a track 400), due to an operation habit of the owner, similarity between the sliding operation (for example, a sliding direction and a sliding distance) and a sliding operation corresponding to the decision model is relatively high. Therefore, the decision model may decide that the user that performs the sliding operation is the owner, so that the terminal device may be allowed to perform processing based on the sliding operation.

Comparatively, as shown in FIG. 5, when another user browses a picture and performs a sliding operation (as shown in a track 500), because an operation habit of the another user is different from that of the owner, similarity between the sliding operation (for example, a sliding direction and a sliding distance) and the sliding operation corresponding to the decision model is relatively low. Therefore, the decision model may decide that the user that performs the sliding operation is not the owner, so that the terminal device may be forbidden to perform processing based on the sliding operation, and the interface may be switched to the screen lock interface.

According to the method provided in this application, security of the terminal device can be improved. For example, because finger sizes or touch strengths of adults and children are obviously different, according to the solution of the present invention, it can be effectively distinguished, by using the foregoing decision model, whether an adult or a child performs an operation. Therefore, even if the child knows a password of a terminal device of a parent, a property loss caused to the parent due to an operation of the child can still be avoided, for example, enabling a function such as transferring or purchasing.

Optionally, in this embodiment of this application, the terminal device may further store at least one decision model #2. Specifically, the at least one decision model #2 may be in a one-to-one correspondence with at least one non-owner user, and each decision model #2 may be used to decide whether a user operation is an operation performed by a corresponding non-owner user. In other words, each decision model may be a model generated based on pre-training of an operation performed by a corresponding non-owner user.

In this case, the processor may further decide whether a decision model #2A that matches the data #1 exists in the at least one decision model #2. For example, if a difference degree (for example, an absolute value of a difference) between a value of each dimension of data #1 and a value of each dimension of the decision model #2A is less than or equal to a specified threshold #e, the processor may determine that the user that performs the user operation #1 is a non-owner user (denoted as a user #2) corresponding to the decision model #2A.

Alternatively, if a difference degree (for example, an absolute value of a difference) between each value of Y dimensions in X dimensions of the data #1 and each value of Y dimensions in X dimensions of the decision model #2A is less than or equal to a specified threshold #e, the processor may determine that the user that performs the user operation #1 is a user #2. Y is less than or equal to X, and the ratio of Y to X is greater than or equal to a specified threshold #f.

Then, the processor may determine operation permission corresponding to the user #2.

The operation permission may be used to indicate an application program that can be used by the user #2; or the operation permission may be used to indicate an application program (for example, a payment application or a chat application) that is forbidden to be used by the user #2.

Alternatively, the operation permission may be used to indicate a function that can be used by the user #2; or the operation permission may be used to indicate a function (for example, making a call) that is forbidden to be used by the user #2.

Alternatively, the operation permission may be used to indicate an operation interface that can be accessed by the user #2; or the operation permission may be used to indicate an interface (for example, a photo browsing interface) that is forbidden to be accessed by the user #2.

Therefore, the processor may determine, based on the permission of the user #2, whether the processing corresponding to the user operation #1 is allowed.

For example, if the user operation #1 is an operation used to start the application program #1, the processor may decide, based on the permission of the user #2, whether the application program #1 can be used by the user #2. If the permission of the user #2 indicates that the application program #1 can be used by the user #2, the processor may start the application program #1, If the permission of the user #2 indicates that the application program #1 cannot be used by the user #2, the processor may forbid the application program #1. In addition, optionally, if the permission of the user #2 indicates that the application program #1 cannot be used by the user #2, the processor may lock the terminal device, to be specific, the terminal device can continue to be used only after the terminal device is unlocked again.

For another example, if the user operation #1 is an operation used to switch the current interface to the interface #1, the processor may decide, based on the permission of the user 42, whether the interface #1 can be accessed by the user 42. For example, the user operation #1 may be a screen unlocking operation. In this case, if the permission of the user #2 indicates that the user #2 is allowed to unlock the screen, the processor may control the terminal device to present an interface that needs to be presented after the screen is unlocked. If the permission of the user #2 indicates that the user #2 is not allowed to unlock the screen, the processor may control the terminal device to enable the current interface to remain as the screen lock interface.

For another example, if the user operation #1 is an operation used to perform the function #1 (for example, transferring, paying, making a call, or sending and receiving information), the processor may decide, based on the permission of the user #2, whether the function #1 can be used by the user #2. If the permission of the user #2 indicates that the function #1 can be used by the user #2, the processor may control the terminal device to perform the function #1. If the permission of the user 42 indicates that the function #1 cannot be used by the user #2, the processor may forbid the terminal device to perform the function #1. In addition, optionally, if the permission of the user #2 indicates that the function #1 cannot be used by the user #2, the processor may lock the terminal device, to be specific, the terminal device can continue to be used only after the terminal device is unlocked again.

According to the method provided in this application, control flexibility can be improved. For example, when it is decided, according to the foregoing solution, that a person that performs the user operation is not the owner, execution of an application program (for example, photographing) that does not affect security of the terminal may still be allowed.

Method 2

In this embodiment of this application, the terminal device may store a plurality of decision models. The plurality of decision models may be in a one-to-one correspondence with a plurality of users, and each decision model may be used to decide whether a user operation is an operation performed by a corresponding user in other words, each decision model may be a model generated based on pre-training of an operation performed by a corresponding user.

In this case, the processor may further decide whether a decision model (denoted as a decision model #B below for ease of understanding and distinguishing) that matches the data #1 exists in the plurality of decision models. For example, if a difference degree (for example, an absolute value of a difference) between a value of each dimension of the data #1 and a value of each dimension of a decision model #B is less than or equal to a specified threshold #g, the processor may determine that the user that performs the user operation #1 is a non-owner user (denoted as a user #3) corresponding to the decision model #B.

Alternatively, if a difference degree (for example, an absolute value of a difference) between each value of Y dimensions in X dimensions of the data #1 and each value of Y dimensions in X dimensions of a decision model #B is less than or equal to a specified threshold #g, the processor may determine that the user that performs the user operation #1 is a user #3. Y is less than or equal to X, and the ratio of Y to X is greater than or equal to a specified threshold #h.

Then, the processor may determine operation permission corresponding to the user #3.

The operation permission may be used to indicate an application program that can be used by the user #3; or the operation permission may be used to indicate an application program (for example, a payment application or a chat application) that is forbidden to be used by the user #3.

Alternatively, the operation permission may be used to indicate a function that can be used by the user #3; or the operation permission may be used to indicate a function (for example, making a call) that is forbidden to be used by the user #3.

Alternatively, the operation permission may be used to indicate an operation interface that can be accessed by the user 43; or the operation permission may be used to indicate an interface (for example, a photo browsing interface) that is forbidden to be accessed by the user #3.

Therefore, the processor may determine, based on the permission of the user #3, whether the processing corresponding to the user operation #1 is allowed.

For example, if the user operation #1 is an operation used to start an application program #a, the processor may decide, based on the permission of the user #3, whether the application program #a can be used by the user #3. If the permission of the user #3 indicates that the application program #a can be used by the user #3, the processor may start the application program #a. If the permission of the user #3 indicates that the application program #a cannot be used by the user #3, the processor may forbid the application program #a. In addition, optionally, if the permission of the user #3 indicates that the application program #a cannot be used by the user #3, the processor may lock the terminal device, to be specific, the terminal device can continue to be used only after the terminal device is unlocked again.

For another example, if the user operation #1 is an operation used to switch the current interface to an interface #a, the processor may decide, based on the permission of the user #3, whether the interface #a can be accessed by the user #3, For example, the user operation #1 may be a screen unlocking operation. In this case, if the permission of the user #3 indicates that the user #3 is allowed to unlock the screen, the processor may control the terminal device to present an interface that needs to be presented after the screen is unlocked. If the permission of the user #3 indicates that the user #3 is not allowed to unlock the screen, the processor may control the terminal device to enable the current interface to remain as the screen lock interface.

For another example, if the user operation #1 is an operation used to perform a function #a (for example, transferring, paying, making a call, or sending and receiving information), the processor may decide, based on the permission of the user #3, whether the function #a can be used by the user #3. If the permission of the user #3 indicates that the function #a can be used by the user #3, the processor may control the terminal device to perform the function #a. If the permission of the user #3 indicates that the function #a cannot be used by the user #3, the processor may forbid the terminal device to perform the function #a, in addition, optionally, if the permission of the user #3 indicates that the function #a cannot be used by the user #3, the processor may lock the terminal device, to be specific, the terminal device can continue to be used only after the terminal device is unlocked again.

It should be noted that the foregoing permission of the user may be set by the owner, or may be delivered by a manufacturer or an operator to the terminal device. This is not particularly limited in this application.

In addition, in this application, the terminal device may provide two modes. In mode 1, the terminal device may decide, based on the foregoing determined decision model, whether the user that performs the operation is a specified user (for example, the owner). Comparatively, in mode 2, the terminal device may be forbidden to decide, based on the foregoing determined decision model, whether the user that performs the operation is the specified user (for example, the owner). In other words, in the mode 2, the terminal device may not confirm an identity of the user that performs the operation. Therefore, when the owner allows another person to use the terminal device, a case in which the another person is forbidden to use the terminal device because the foregoing method is performed can be avoided, thereby further improving practicability of this application and implementing a humanized setting.

According to the solution in this application, because an operation of a user is habitual, a same user may generate a large quantity of similar operations in a process of operating the terminal device. Training is performed by using a plurality of operations of a same user X, and a decision model is obtained. Based on the decision model, it can be decided whether a user operation is performed by the user X. Therefore, use security of the terminal device can be improved.

Figure 6:
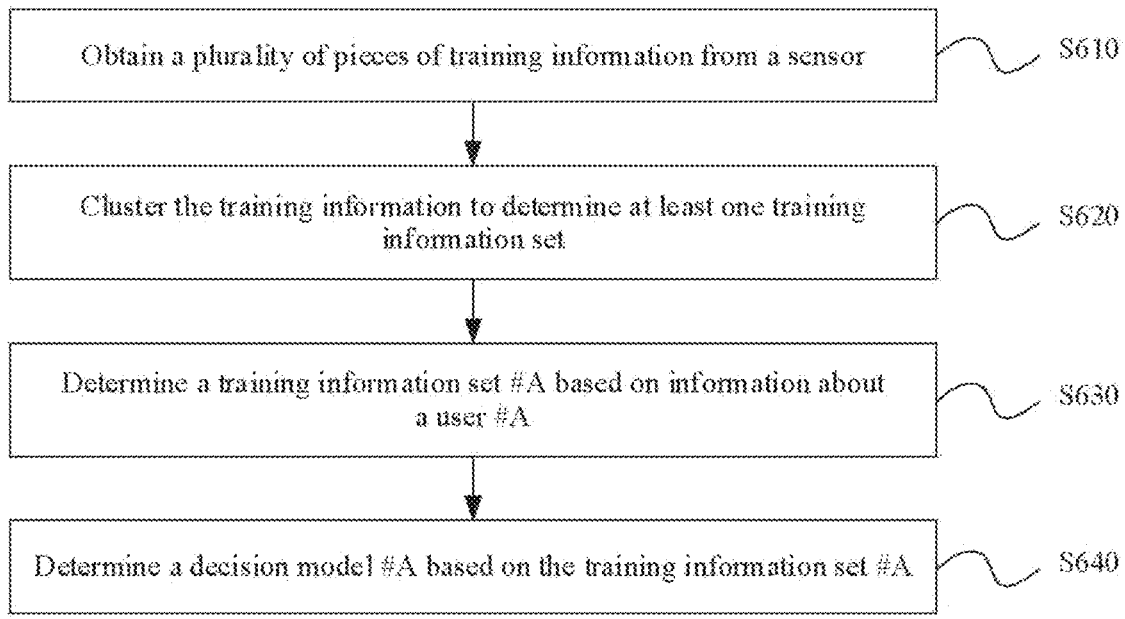
FIG. 6 is a schematic flowchart of an example of a method for determining a decision model in this application.

FIG. 6 shows description of an example of a method 600 for determining the foregoing decision model. For example, the method 600 may be applied to the foregoing terminal device 100.

As shown in FIG. 6, in S610, a processor (for example, the foregoing processor 180) of a terminal device may obtain data (which is an example of training information) detected by a sensor of the terminal device.

By way of example, and not limitation, the data may include at least one of the following data.

1. Related data of a touch operation performed by a user on a touchscreen (which is an example of touch operation information).

By way of example, and not limitation, the foregoing touch detection apparatus may detect the data of the touch operation performed by the user. By way of example, and not limitation, the touch operation may include but is not limited to a tapping (for example, tapping or double-tapping) operation, a sliding operation (for example, single-finger sliding or multi-finger sliding), or the like, and the data of the touch operation may include but is not limited to data of at least one of the following parameters.

a. Force of the Touch Operation

For example, a pressure sensor may be disposed under the touchscreen of the terminal device, so that the force of the touch operation may be detected, and data of the detected force is sent to the foregoing processor.

It should be understood that the foregoing manner of detecting the force of the touch operation is merely an example for description, and the present invention is not limited thereto. For example, the touchscreen may replace the pressure sensor. For example, the touchscreen may be a pressure screen, or a pressure sensing screen.

b. Position of the Touch Operation

For example, the position of the touch operation may be a relative position of a touch area of the touchscreen on the entire touchscreen. When the touch operation is a tapping operation, the position of the touch operation may be a position of a touch point on the screen. When the touch operation is a sliding operation, the position of the touch operation may include a position of a start point of the sliding operation on the screen, may include a position of an end point of the sliding operation on the screen, or may include a position of a sliding track on the screen.

c. Contact Area of the Touch Operation

For example, the contact area of the touch operation may be a contact area that is between the touchscreen and a finger of the user and that is detected by the touch detection apparatus.

d. Contact Time of the Touch Operation

For example, the contact time of the touch operation may be a time of one touch operation detected by the touch detection apparatus, where "one touch operation" may be an operation performed from a time at which a finger touches the touchscreen to a time at which the finger leaves the touchscreen. For example, when the touch operation is a tapping operation, the contact time of the touch operation may be a time in which the touchscreen is touched in one tapping operation. For another example, when the touch operation is a sliding operation, the contact time of the touch operation may be a time in which the touchscreen is touched in one sliding operation.

Alternatively, the contact time of the touch operation may be a time of a plurality of touch operations, where an interval that is of the time and that is detected by the touch detection apparatus is less than or equal to a preset time interval. For example, when the touch operation is an operation during which a finger leaves the touchscreen, such as a double-tapping operation, the contact time of the touch operation may be a total time of touching the touchscreen in one operation process.

e. Sliding Angle of the Sliding Operation

For example, the angle of the sliding operation may be an angle between a horizontal (or vertical) direction of the screen and a connection line between a start position of the sliding operation and an end position of the sliding operation.

f. Sliding Direction of the Sliding Operation

For example, the angle of the sliding operation may be a direction from the start position of the sliding operation to the end position of the sliding operation.

g. Sliding Distance of the Sliding Operation

For example, the sliding distance of the sliding operation may be a straight line length from the start position of the sliding operation to the end position of the sliding operation. Alternatively, the sliding distance of the sliding operation may be a total length of a track of the sliding operation.

It should be understood that a specific example and an obtaining manner of the foregoing parameters are merely examples for description. This is not particularly limited in this application. Data of or information about the foregoing parameters may be obtained by using various manners provided in the prior art.

2. Related data (namely, an example of posture information) of the posture that the terminal device has when the user performs an operation on the terminal device (for example, performs a touch operation on the touchscreen).

For example, the related data of the posture of the terminal device may include data of an angle between the terminal device and a horizontal direction or a gravity direction.

By way of example, and not limitation, the posture information may include but is not limited to data detected by at least one of the following sensors:

a gravity sensor, an acceleration sensor, or a gyroscope.

Because different users have different operation habits and biological features, operations of different users may have different features.

For example, sizes of fingers of different users are different, and consequently touch contact areas of touch operations of different users may be different.

For another example, hand sizes of different users are different, and consequently sliding distances of sliding operations of different users may be different.

For another example, operation habits of different users are different, and consequently sliding directions, angles, or distances of sliding operations of different users may be different.

For another example, operation habits of different users are different, and consequently touch times or touch forces of touch operations of different users may be different.

For another example, operation habits of different users are different, and consequently postures (for example, tilt angles) that the terminal device has when different users perform operations on the terminal device may be different.

In addition, affected by an operation habit and a biometric feature of the user, data that is of operations performed by a same user and that is detected by the sensor is similar.

For example, similarity between touch contact areas of touch operations of a same user is relatively high.

For another example, similarity between sliding distances of sliding operations of a same user is relatively high.

For another example, similarity between sliding directions, angles, or distances of sliding operations of a same user is relatively high.

For another example, similarity between touch times or touch forces of touch operations of a same user is relatively high.

For another example, similarity between postures (for example, tilt angles) that the terminal device has when a same user performs operations on the terminal device is relatively high.

Therefore, in S620, the processor of the terminal device may perform clustering processing on the data obtained from the foregoing sensor, to classify operations of a same user into a same type or group.

For example, by way of example, and not limitation, a same operation may be detected by a plurality of sensors. For example, a sliding operation may enable a touchscreen and a pressure sensor to obtain data In addition, for a sliding operation, the touchscreen may obtain parameters in a plurality of dimensions such as a sliding direction, a sliding distance, and a sliding angle.

In this case, for an operation, a plurality of pieces of data detected by different sensors may be used as information of different dimensions of the operation, to generate a data point (or a coordinate point) having a specific value in each dimension in multi-dimensional (for example, two-dimensional or three-dimensional) space.

Alternatively, for an operation, data of a plurality of parameters detected by a same sensor may be used as information of different dimensions of the operation, to generate a point having a specific value in each dimension in multi-dimensional (for example, two-dimensional or three-dimensional) space.

Therefore, for a plurality of operations, a plurality of data points can be determined.

Therefore, the plurality of data points may be clustered.

By way of example, and not limitation, in this embodiment of this application, clustering may be performed by using any one of the following methods.

1. Density-Based Clustering Method

An idea of a density-based method is: to set a distance radius, connect all reachable points in a minimum quantity of points, and decide all the reachable points into a same class. In a simple way, the principle is to draw a circle. Two parameters need to be defined. One is a maximum radius of the circle, and the other is a minimum quantity of points that should be contained in the circle. Points finally in a same circle are points that belong to a same class.

The density-based clustering method has a relatively good effect on a concentration area. In order to find clusters of various shapes, such methods consider clusters as dense object areas, in data space, separated by low-density areas. A density-based clustering method that is based on a high-density connection area is proposed. This algorithm assigns an area having high enough density as a cluster and finds a cluster of any shape in space data having noise.

The following briefly describes several key indicators in the density-based clustering method:

E neighborhood: an area, having a radius of E, of a given object is referred to as the E neighborhood of the object;

core object: if a quantity of sample points in the E neighborhood of the given object is greater than or equal to MinPts, the object is referred to as the core object;

direct density reachability: for a sample set D, if a sample point q is in an E neighborhood of p, and p is a core object, an object q is directly density reachable from an object p;

density reachability: for the sample set D, a string of sample points p1, p2, . . . , pn are given, where p=p1 and q=pn; if an object pi is directly density reachable from pi−1, the object q is density reachable from the object p; it should be noted that the density reachability is unidirectional, and points that are density reachable may be of a same type; and density connection: there is a point o in the sample set D; if an object o is density reachable to both of the object p and the object q, p and q are density connected.

The density reachability is a transitive closure of the direct density reachability, and this relationship is asymmetric. The density connection has a symmetrical relationship.

An objective of density-based clustering is to find a maximum set of density connected objects.

For the density-based clustering, a cluster is searched for by checking an r neighborhood of each point in a database. If the r neighborhood of a point p contains more points than MinPts, a new cluster with p as a core object is created. Then, density-based clustering iteratively aggregates objects directly density reachable from these core objects. In this process, some density reachable clusters may be merged. This process ends when no new point may be added to any cluster.

For example, it is assumed that a radius E=3, MinPts=3, a point {m, p, p1, p2, o} exists in the E neighborhood of the point p, a point {m, q, p, m1, m2} exists in an E neighborhood of a point m, a point {q, m}; exists in the E neighborhood of the point q, a point {o, p, s} exists in the E neighborhood of the point o, and a point {o, s, s1} exists in an E neighborhood of a point s.

Then, core objects are p, m, o, and s. q is not a core object, because a quantity of points in the E neighborhood corresponding to q is equal to 2 and is less than MinPts=3, where the point m is directly density reachable from the point p because m is in the E neighborhood of p and p is a core object;

the point q is density reachable from the point p because the point q is directly density reachable from the point in, and the point in is directly density reachable from the point p; and the point q is density connected to the point s because the point q is density reachable from the point p, and s is density reachable from the point p.

The following briefly describes a generation principle and process of a cluster.

A basic point of a principle of the density-based clustering method is to determine a value of a radius Eps.

A distance metric needs to be selected for the density-based clustering method. In a to-be-clustered data set, a distance between two random points reflects density between the points, and indicates whether the points can be clustered into a same class. Since it is difficult to define density of high-dimensional data by using the density-based clustering method, a Euclidean distance can be used to measure points in two-dimensional space.

The density-based clustering method requires the user to input two parameters. One parameter is a radius (Eps), indicating a range of a circular neighborhood with a given point P as a center. The other parameter is a minimum quantity of points (MinPts) in the neighborhood with the point P as the center. If the following condition that a quantity of points in a neighborhood with the point P as the center and whose radius is Eps is not less than MinPts is met, the point P is referred to as the core point.

In the density-based clustering method, a concept of k-distance is used, where the k-distance refers to the following: For a random point P(i) in a given data set P={p(i); i=0, 1, . . . n}, distances between the point P(i) and all points in a subset S={p(1), p(2), . . . , p(i−1), p(i+1), . . . , p(n)} of a set D are calculated, where the distances are sorted in ascending order, and assuming that a sorted distance set is D={d(1), d(2), . . . , d(k−1), d(k), d(k+1), . . . , d(n)}, d(k) is referred to as the k-distance. In other words, the k-distance is a distance that is $k^{th}$ smallest in the distances between the point p(i) and all points (except point p(i)). The k-distance is calculated for each point p(i) in the to-be-clustered set, and finally, a k-distance set E={e(1), e(2), . . . , e(n)} of all points is obtained.

The radius Eps is calculated based on experience: Sort the set E in ascending order based on the obtained k-distance set E of all points, to obtain a k-distance set E', a curve chart of a change of the k-distance in the sorted E' set is fitted, a curve is drawn, and by observing the curve, a value of a k-distance corresponding to a location that changes sharply is determined as the value of the radius Eps.

The minimum quantity of points MinPts is calculated based on experience: a size of MinPts is determined, actually in other words, a value of k in the k-distance is determined, and if k=4 in the density-based clustering method, MinPts=4.

In addition, if a result of empirical value clustering is not satisfactory, values of Eps and MinPts can be properly adjusted, and the most appropriate parameter value is selected after a plurality of iterative calculations and comparisons. It can be learned that if MinPts remains unchanged, when Eps is excessively large, most points are clustered in a same cluster, and when Eps is excessively small, a cluster is split. If Eps remains unchanged, when the value of MinPts is excessively large, points in a same cluster are marked as noise points, and when MinPts is excessively small, a large quantity of core points are found.

It should be noted that, in the density-based clustering method, two parameters need to be input, and the two parameters are calculated by using empirical knowledge. Calculation of the radius Eps depends on calculation of the k-distance. In DBSCAN, if k=4, in other words, MinPts=4, a proper value of the radius Eps needs to be found based on the k-distance curve and based on experience and observation.

Subsequently, core points may be connected to generate a cluster.

The core points can be connected (which is referred to as "density reachable" in some books), and circular neighborhoods that each have a radius of an Eps length and that are formed by the core points are interconnected or overlapped, and the connected core points and all points in the neighborhoods at which the core points are located form a cluster. An idea of calculating the connected core points to perform the calculation in a manner of performing breadth traversal and depth traversal on a set: a point p is extracted from a core point set 5, a set C1 of connected core points may be obtained by calculating whether the point p is connected to each point (except the point p) in the set 5, and then, the point p in the set S and points in the set C1 are deleted from the set S, to obtain a core point set S1. Then, a point p1 is extracted from S1, whether p1 is connected to each point (except the point p1) in the core point set S1 is calculated, and a connected core point set C2 may be obtained. Subsequently, the point p1 in the set S1 and all points in the set C2 are deleted, to obtain a core point set S2, and finally to obtain p, p1, p2, . . . , and C1, C2, . . . , so that a core point of a cluster is formed. Finally, all points in the core point set S are traversed to obtain all clusters.

It should be noted that, if Eps is set to an excessively large value, all points are grouped into one cluster; or if Eps is set to an excessively small value, a quantity of clusters is excessively large. If MinPts is set to an excessively large value, many points are considered as noise points.

Data points can be classified into the following three classes based on density of the data points.

(1) Core point: Density of the point in a neighborhood exceeds a specified threshold MinPs.

(2) Boundary point: The point is not a core point, but a neighborhood of the point contains at least one core point.

(3) Noise point: The point is not a core point or a boundary point.

With the foregoing classification of the data points, aggregation may be performed in the following way: each core point and all core points in a neighborhood of the core point are placed in a same cluster, and a boundary point and a core point in a neighborhood of the boundary point are placed in a same cluster.

An ordering points to identify the clustering structure (OPTICS) is one of different density-based clustering methods. The OPTICS first searches for a feature of high density, and then sets a parameter based on the feature of high density, thereby improving a density-based clustering effect. An objective of the OPTICS is to cluster data in space based on density distribution. In other words, after processing by using an OPTICS algorithm, clustering having any density can be theoretically obtained. Because the OPTICS algorithm outputs an ordered queue of samples, clustering of any density can be obtained from this queue.

The OPTICS algorithm is based on the following two aspects.

1. Parameters (a radius, and a minimum quantity of points): The parameters are parameters that are input, including a radius $\varepsilon$ and the minimum quantity of points MinPts.

2. Definition (a core point, a core distance, a reachable distance, and direct density reachability):

A core point of the OPTICS algorithm is defined as follows: If a quantity of points in a radius of a point is not less than the minimum quantity of points, the point is the core point, and the mathematical description is: $N\varepsilon(P) \geq MinPts$.

On this basis, a definition of the core distance can be introduced, to be specific, the core distance is a distance coreDist (P) between the core point and a point that is $MinPts_{th}$ closest to the core point.

$$coreDist(P) = \begin{cases} UNDIFED, \text{ if } N(P) \leq MinPts \\ MinPts_{th} \text{ Distance in } N(P), \text{ else} \end{cases}$$

As to the reachable distance, for a core point P, a reachable distance from O to P is defined as the distance from O to P or a core distance of P, namely, a formula $$reachDist(O, P) = \begin{cases} UNDIFED, \text{ if } N(P) \leq MinPts \\ \max(coreDist(P), dist(O, P)), \text{ else} \end{cases}$$

O is directly density reachable to P, to be specific, P is a core point, and a distance from P to O is less than a radius.

By way of example, and not limitation, a calculation process of the OPTICS algorithm is as follows.

Step 1: Input a data sample D, and initialize reachable distances and core distances of all points to MAX, and input the radius $\varepsilon$ and the minimum quantity of points MinPts.

Step 2: Establish two queues, namely, an ordered queue (a core point and a directly density reachable point of the core point), and a result queue (storing a sample output a processing order).

Step 3: If all data in D is processed, the algorithm ends, otherwise, a point that is not processed as a core object is selected from D, the core point is placed into the result queue, and a directly density reachable point of the core point is placed into the ordered queue, where directly density reachable points are arranged in ascending order based on reachable distances.

Step 4: If the ordered sequence is empty, go back to step 2, otherwise, extract a first point from the ordered queue. For example, in this process, it is first determined whether the point is a core point; if not, go back to step 3; if yes, the point is stored in the result queue if the point is not in the result queue. If the point is a core point, all directly density reachable points of the point are found, the points are placed into the ordered queue, and points in the ordered queue are reordered based on reachable distances; if the point is already in the ordered queue and a new reachable distance is relatively small, the reachable distance of the point is updated. The foregoing process is repeated until the ordered queue is empty.

Step 5: The algorithm ends.

In addition, by way of example, and not limitation, in this embodiment of the present invention, a minimum quantity of points in a class may be determined based on a ratio of a quantity of times of operations performed by a user that needs to be authenticated on the terminal device to a quantity of times of operations performed by all users that use the terminal device on the terminal device. For example, if there are 500 points, the minimum quantity may be set to 300.

In addition, for example, if the user that needs to be authenticated is the owner of the terminal device, only one class may be determined in S210, and data that can be clustered in this class may be marked as 1, and data that cannot be clustered in this class may be marked as 0. That is, data marked as 1 may be considered to be in a training information set.

2. Partition-Based Clustering Method

A principle of a partition-based method is: to first determine a quantity of types of scatter points that need to be aggregated, to select several points as initial center points, and then to perform iterative relocation on data points according to a predefined heuristic algorithm until a target effect that "points within a class are close enough, and points between classes are far enough" is finally achieved.

A K-means algorithm is an example of the partition-based clustering method. The K-means algorithm divides n objects into k clusters by using k as a parameter, so that relatively high similarity exists in a cluster, and relatively low similarity exists between the clusters. A processing process of the K-means algorithm is: to first select k objects randomly, where each object initially represents an average value or a center of a cluster, that is, to select k initial centroids; to assign each remaining object to a closest cluster based on a distance between the object and each cluster center; and then to recalculate an average value of each cluster. This process is repeated until a criterion function converges and until a centroid does not change significantly. Usually, a square error criterion is used. A sum of square error (SSE) is used as a global target function, to be specific, a sum of square of a Euclidean distance from each point to a closest centroid is minimized. In this case, a centroid of a cluster is an average value of all data points in the cluster. The following describes specific steps.

Step 1: Select k points as the initial centroids.

Step 2: Assign each point to a closest centroid to form k clusters.

Step 3: Recalculate a centroid of each cluster.

Step 4: Repeat steps 2 and 3 until the cluster does not change or reaches a maximum quantity of iterations.

A specific process of the K-Means algorithm is described above.

3. Hierarchical Clustering Method

A principle of the hierarchical clustering method (hierarchical method) is to first calculate a distance between samples. Points that are closest to each other are merged into a same class each time. Then, a distance between classes is calculated, and classes that are closest to each other are combined into one large class. Merging is continued until one class is merged. Methods for calculating the distance between classes include a shortest distance method, a longest distance method, an intermediate distance method, and a class average method. For example, the shortest distance method defines the distance between classes as a shortest distance between samples of classes.

Hierarchical clustering algorithms are classified, based on a hierarchical decomposition sequence, into bottom-up and top-down hierarchical clustering algorithms, namely, an agglomerative hierarchical clustering algorithm and a divisive hierarchical clustering algorithm (agglomerative and divisive), which can also be understood as bottom-up and top-down methods. The bottom-up method is that each object is a class at the beginning, and then same classes look for each other based on linkage, to finally form one "class". The top-down method is a converse bottom-up method. At the beginning, all objects belong to one "class". Then, different objects are excluded based on the linkage, and finally, each object becomes a "class". There is no superiority or inferiority between the two methods. In practice, it is determined, based on data features and a desired quantity of "classes", whether the top-down method or the bottom-up method is faster. Methods for determining a "class" based on the linkage are the shortest distance method, the longest distance method, the intermediate distance method, and the class average method (where the class average method is usually considered as a most frequently used and best method due to good monotonicity of the class average method from a perspective and moderate extent of space expansion/concentration of the class average method from another perspective). To make up for deficiency of decomposition and merging, hierarchical merging often needs to be combined with another clustering method, such as circular positioning.

A policy of agglomerative hierarchical clustering is to first consider each object as a cluster, and then combine these atomic clusters into an increasingly large cluster until all objects are in the same cluster or a termination condition is met. Most hierarchical clustering is agglomerative hierarchical clustering, and a difference is that definitions of similarity between clusters are different. The following shows a process of using the agglomerative hierarchical clustering algorithm with a smallest distance:

Step 1: Consider each object as a class, and calculate a smallest distance between every two objects.

Step 2: Combine two classes with the smallest distance into a new class.

Step 3: Recalculate a distance between the new class and all classes.

Step 4: Repeat steps 2 and 3 until all classes are merged into one class.

It should be understood that the foregoing listed clustering methods and process are merely examples for description, and other methods that can aggregate data generated by operations of a same user in a plurality of pieces of data into one class shall fall within the protection scope of the present invention.

Therefore, any one of a plurality of classes (namely, a plurality of training information sets) determined according to the foregoing clustering algorithms may correspond to one user, in other words, data in one class may be considered as data generated by an operation performed by a corresponding user.

It should be noted that, during the obtaining of the foregoing training information in S610, if the terminal device is used by N users, and a quantity of operations of each user reaches a specific scale, theoretically, N training information sets (or N classes) can be obtained based on the processing process described in S620, where the foregoing "scale" may be determined based on a parameter used by in the clustering algorithms, for example, density. On the contrary, during the obtaining of the foregoing training information in S610, if the terminal device is used by N users, and a quantity of operations of only M users reaches a specific scale, theoretically, M training information sets (or M classes) can be obtained based on the processing process described in S620, where N may be an integer greater than or equal to 1, M may be an integer greater than or equal to 1, and M is less than N.

For ease of understanding and description, the following uses an example in which the M training information sets are obtained in S620 for description.

In S630, the processor may determine, in the M training information sets, a training information set #A corresponding to a user #A.

By way of example, and not limitation, the following methods for determining the training information set #A may be listed.

Method 1

Alternatively, when the density-based clustering method is used in S620, if the user #A is the owner of the terminal device, there is a relatively large quantity of training information obtained based on an operation of the user #A. In this case, a set having a maximum quantity of points (or training information) in the determined plurality of training information sets may be determined as the training information set #A.

Alternatively, when the density-based clustering method is used in S620, if the user #A is the owner of the terminal device, and another user performs relatively few operations on the terminal device, there may be a case in which only one training information set can be obtained after clustering. In this case, the only one training information set may be determined as the training information set #A.

Alternatively, when the density-based clustering method is used in S620, if quantities of operations performed by a plurality of users all meet a minimum clustering condition, in other words, the plurality of training information sets may be clustered in S620, the processor may obtain information about a frequency of using the terminal device by the user #A, and determine the training information set #A based on the information about the use frequency. For example, if the information about the use frequency indicates that the user #A is a user that uses the terminal device most frequently in the plurality of users, a set having a maximum quantity of points (or training information) in the determined plurality of training information sets may be determined as the training information set #A. If the information about the use frequency indicates that the user #A is a user that uses the terminal device least frequently in the plurality of users, a set having a minimum quantity of points (or training information) in the determined plurality of training information sets may be determined as the training information set #A.

In addition, by way of example, and not limitation, the information about the use frequency may be input by the user into the terminal device, or the information about the use frequency may be provided by a server or an operator to the terminal device. This is not particularly limited in the present invention.

Method 2

For example, when the K-means clustering method is used in S620, feature information of each class, or a value of feature information of each class, may be determined.

Therefore, the processor may obtain feature information of the user #A, and determine a training information set having feature information similar to that of the user #A as the training information set #A, in other words, similarity between feature information of the foregoing determined training information set #A and the feature information of the user #A is greater than or equal to a specified threshold #a, or in other words, a difference between a value of the feature information of the foregoing determined training information set #A and a value of the feature information of the user #A is less than or equal to a specified threshold #b.

In addition, by way of example, and not limitation, the information about the use frequency may be input by the user into the terminal device, or the information about the use frequency may be provided by a server or an operator to the terminal device. This is not particularly limited in the present invention.

It should be understood that the foregoing listed methods for determining the training information set #A are merely examples for description, and the present invention is not limited thereto. For example, when the data that can be clustered in this class is marked as 1 and the data that can be clustered in this class is marked as 0, the data marked as 1 may be determined as data (or training information) in the training information set #A.

In S640, the processor may determine a decision model #A for the user #A based on some or all of the training information in the training information set #A.

For example, by way of example, and not limitation, each piece of training information in the training information set #A may have values of a plurality of dimensions. Therefore, the processor may perform average processing on values of a same dimension of the plurality of pieces of training information, to obtain one piece of reference information (which is an example of a decision model). The value of an $i^{th}$ dimension of the reference information is an average value of values of the $i^{th}$ dimension of the plurality of pieces of training information.

For another example, the processor may determine, as the value of the $i^{th}$ dimension of the reference information, a value that appears most frequently in values of the $i^{th}$ dimension of the plurality of pieces of training information.

It should be understood that the foregoing listed methods for determining the decision model #A are merely examples for description, and this application is not limited thereto. Other methods and processes that can train the decision model based on training data fall within the protection scope of this application.

For example, in this embodiment of the present invention, the decision model may be determined according to an adaptive boosting (Adaboost) algorithm. Specifically, Adaboost is an iterative algorithm, and a core idea of Adaboost is to train different classifiers (weak classifiers) for a same training set, and then aggregate these weak classifiers to form a stronger final classifier (strong classifier). The algorithm is implemented by changing data distribution. A weight of each sample is determined based on whether classification of each sample in each training set is correct and accuracy of previous overall classification. A new data set having a modified weight is sent to a lower-layer classifier for training, and finally, classifiers obtained through training each time are finally merged and used as a final determining classifier. An Adaboost classifier can be used to exclude some unnecessary training data features and focus on key training data.

This algorithm is actually a simple weak classification algorithm improvement process. Through continuous training, data classification capability in this process can be improved. The following shows the whole process.

1: A first weak classifier is first obtained by learning N training samples (namely, a plurality of pieces of training information in one training information set).

2: Combine incorrectly classified samples and other new data to form a new training sample set having N training samples, and obtain a second weak classifier by learning the sample set.

3: Combine incorrectly divided samples in 1 and 2 with other new samples to form another new training sample set having N training samples, and obtain a third weak classifier by learning the sample set.

4: Finally obtain strong classifiers that are improved. In other words, weight of each classifier determines a class in which data is classified.

According to a solution in this application, because an operation of the user is habitual, a same user may generate a large quantity of similar operations in a process of operating the terminal device. The terminal device clusters the plurality of pieces of training information determined based on the user operations detected in a first time period, so that training information in a same training information set obtained after clustering corresponds to a same user, and a decision model generated based on the training information in the training information set can effectively decide whether a user that performs an operation is a user corresponding to the training information set. Therefore, to implement user identification, a biometric feature recognition device does not need to be additionally provided for the terminal device, so that costs of the terminal device are reduced. In addition, because a user operation of producing the training information does not need to be performed by the user intentionally, in other words, an additional operation burden of the user does not need to be added to implement the user identification, user experience can be improved, and practicability of the user identification in this application can be improved.

Optionally, the training information (namely, information including data detected by a plurality of sensors that are triggered by one user operation) obtained in S610 may be generated based on a user operation for a specified application (denoted as an application below for ease of understanding and differentiation). In addition, the processor may record a correspondence between the generated decision model (denoted as a decision model #A1) and the application #A. Therefore, in S640, when detecting the user operation, the terminal device may determine the application targeted by the user operation. For example, when determining that the user operation is an operation for the application the terminal device may determine the decision model #A1 based on the foregoing correspondence, and decides, based on the decision model #A1, whether the detected user operation is performed by the user #A.

Because an operation performed by a user on an application may be more habitual, for example, when a same user operates a same application (for example, an application for browsing news or an e-book), similarity of distances, directions, angles, or the like between a plurality of sliding operations performed by the user may be greater than similarity of distances, directions, angles, or the like between a plurality of sliding operations performed by the user when the user operates different applications (for example, applications for news browsing and games). Therefore, accuracy and reliability of user identification in this application can be further improved by using the foregoing process.

Optionally, the training information (namely, information including data detected by a plurality of sensors that are triggered by one user operation) obtained in S610 may be generated based on a user operation for a specified operation interface (denoted as an operation interface below for ease of understanding and differentiation). In addition, the processor may record a correspondence between the generated decision model (denoted as the decision model #A2) and the operation interface #A. Therefore, in S640, when detecting the user operation, the terminal device may determine the operation interface targeted by the user operation. For example, when determining that the user operation is an operation for the operation interface #A, the terminal device may determine the decision model #A2 based on the foregoing correspondence, and decides, based on the decision model #A2, whether the detected user operation is performed by the user #A.

Because an operation performed by a user on an operation interface may be more habitual, for example, when a same user operates a same operation interface (for example, a text reading interface), similarity of distances, directions, angles, or the like between a plurality of sliding operations performed by the user may be greater than similarity of distances, directions, angles, or the like between a plurality of sliding operations performed by the user when the user operates different operation interfaces (for example, a text reading interface and a game interface). Therefore, accuracy and reliability of user identification in this application can be further improved by using the foregoing process.

Optionally, the training information (namely, information including data detected by a plurality of sensors that are triggered by one user operation) obtained in 610 may be generated based on a user operation of a specified type (denoted as a type #A below for ease of understanding and differentiation). In addition, the processor may record a correspondence between the generated decision model (denoted as a decision model #A3) and the type #A. Therefore, in S640, when detecting the user operation, the terminal device may determine the type of the user operation. For example, when determining that the type of the user operation is a type #A, the terminal device may determine the decision model #A3 based on the foregoing correspondence, and decides, based on the decision model #A3, whether the detected user operation is performed by the user #A.

Because operation of a same type of a user may be more habitual, for example, similarity between parameters (for example, touch forces) of operations of a same type (for example, sliding) of a same user may be greater than similarity between parameters (for example, touch forces) of operations of different types (for example, sliding and tapping). Therefore, accuracy and reliability of user identification in this application can be further improved by using the foregoing process.

Figure 7:
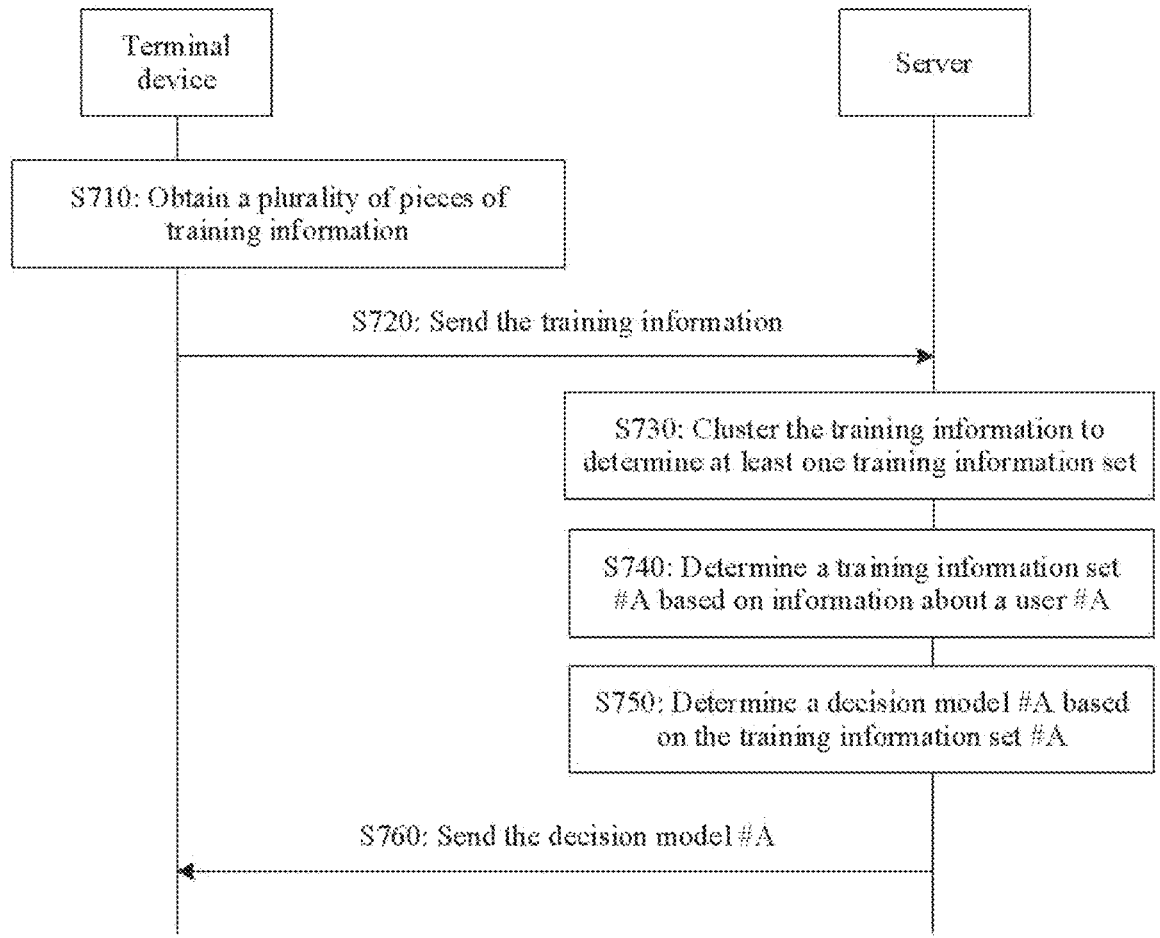
FIG. 7 is a schematic interaction diagram of an example of a method for determining a decision model in this application.

FIG. 7 shows description of an example of a user identification method 700 in this application. For example, the method 700 may be performed by the foregoing terminal device 100 in cooperation with a server.

The server may be a device having a computing function, such as a computer, and the server may be communicatively connected to the terminal device by using, for example, the Internet.

As shown in FIG. 7, in S710, the terminal device may determine training information based on a user operation. In addition, the process may be similar to the process described in S610. To avoid repetition, detailed description thereof is omitted herein.

In S720, the terminal device may send the obtained training information to the server.

In S730, the server may perform clustering processing on the training information, to determine the at least one training information set. The process may be similar to the process described in S620. To avoid repetition, detailed description thereof is omitted herein.

In S740, the server may determine the training information set #A in the determined at least one training information set. The process may be similar to the process described in S630. To avoid repetition, detailed description thereof is omitted herein.

In S750, the server may determine the decision model #A based on the training information set #A. The process may be similar to the process described in S740. To avoid repetition, detailed description thereof is omitted herein.

In S760, the server may send the decision model #A to the terminal device.

Optionally, in this embodiment of the present invention, the generated decision model may be used to decide whether a user operating a mobile phone is an owner, in other words, the training information obtained in S610 or S710 may include training information generated based on an operation of the owner. For example, when a density-based clustering method is used, for example, a manner such as increasing a quantity of collected information may be used to increase a proportion of the training information generated by the operation of the owner, to ensure that the training information generated by the operation of the owner can be aggregated into one class. In S630 or S730, a training information set corresponding to the operation of the owner may be determined based on information about the owner. Therefore, in S640 or S740, a decision model used to decide whether the user that performs the operation is the owner can be generated based on the training information set obtained after clustering, and further, whether a user operation is performed by the owner can be decided based on the determined decision model.

Figure 8:
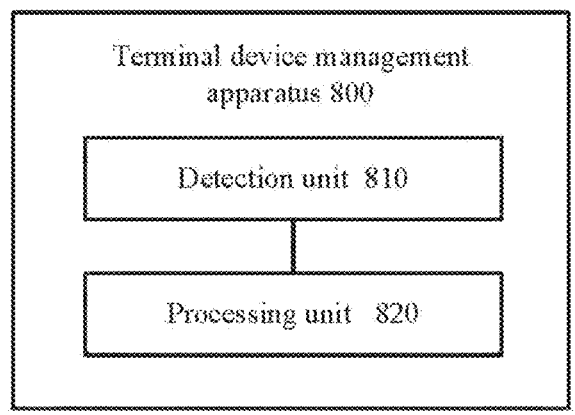
FIG. 8 is a schematic block diagram of an example of a user identification apparatus in this application.

FIG. 8 is a schematic block diagram of a terminal device management apparatus 800 according to an embodiment of this application.

As shown in FIG. 8, the apparatus 800 includes:

a detection unit 810, configured to obtaining operation information corresponding to a first operation, where the operation information includes touch information and/or posture information of the terminal device; and a processing unit 820, configured to manage a terminal device based on a matching degree between the operation information corresponding to the first operation and a first decision model, where the first decision model is determined based on operation information of an operation performed by a first user.

Optionally, the touch information includes at least one of the following information: information about a force of the touch operation, information about a position of the touch operation, information about a contact area of the touch operation, information about a contact time of the touch operation, information about a sliding angle of the touch operation, information about a sliding direction of the touch operation, or information about a sliding distance of the touch operation.

Optionally, the first user includes an owner of the terminal device.

Optionally, the processing unit 820 is specifically configured to: when the matching degree between the operation information corresponding to the first operation and the first decision model is greater than a preset first threshold, perform processing corresponding to the first operation.

For example, when the first operation is an operation on a picture (for example, an operation of deleting the picture), if it is decided that the matching degree between the operation information corresponding to the first operation and the first decision model is greater than the preset first threshold, the picture may be processed (for example, deleting the picture) based on the operation.

Optionally, the processing unit 820 is specifically configured to: when the matching degree between the operation information corresponding to the first operation and the first decision model is greater than a preset first threshold, unlock the first application.

For example, when the first operation is a pattern unlocking operation, if it is decided that the matching degree between the operation information corresponding to the first operation and the first decision model is greater than the preset first threshold, it may be determined that each first application may be unlocked when an unlock pattern is correct.

Optionally, the processing unit 820 is specifically configured to: when the matching degree between the operation information corresponding to the first operation and the first decision model is less than a preset first threshold, forbid processing corresponding to the first operation.

For example, when the first operation is an operation on a picture (for example, an operation of deleting the picture), if it is decided that the matching degree between the operation information corresponding to the first operation and the first decision model is less than the preset first threshold, processing the picture based on the operation may be forbidden (for example, deleting the picture is forbidden).

Optionally, the processing unit 820 is specifically configured to: when the matching degree between the operation information corresponding to the first operation and the first decision model is less than a preset first threshold, switch an interface currently displayed of the terminal device to a screen lock interface.

Optionally, the processing unit 820 is specifically configured to: when a matching degree between the operation information corresponding to the first operation and the first decision model is less than a preset first threshold, play a preset alert signal.

Optionally, the processing unit 820 is specifically configured to: when the matching degree between the operation information corresponding to the first operation and the first decision model is less than a preset first threshold, lock the first application.

The first operation may be an operation for the first application, for example, an operation on an interface of the first application.

Alternatively, the first operation may be an operation before the first application is started, or the first operation may be an operation performed when the first application is running in the background.

Optionally, the first operation is an operation detected before a second operation used to start the first application is detected, and the processing unit 820 is specifically configured to: when the detection unit 810 detects the second operation, skip displaying an unlock interface, and start the first application.

Optionally, the first operation is an operation detected before a second operation used to start the first application is detected, and the processing unit 820 is specifically configured to: when the detection unit 810 detects the second operation, display an unlock interface.

Optionally, the first operation is an operation detected before a second operation used to start the first application is detected, and the processing unit 820 is specifically configured to: forbid starting the first application.

Optionally, the first operation is an operation used to unlock the first application.

Optionally, the first application includes at least one of the following applications: an application operated by the first operation, an application preset by the owner of the terminal device, or an application preset by a manufacturer of the terminal device.

Optionally, the processing unit 820 is specifically configured to: when the matching degree between the operation information corresponding to the first operation and the first decision model is less than a preset first threshold, determine a second decision model of a plurality of decision models based on the operation information corresponding to the first operation, where a matching degree between the second decision model and the operation information corresponding to the first operation is greater than a preset second threshold, or the second decision model is a decision model having a largest matching degree with the operation information corresponding to the first operation in the plurality of decision models, the plurality of decision models are in a one-to-one correspondence with a plurality of users, and each decision model is determined based on operation information of an operation performed by a corresponding user; and manage the terminal device based on user permission of a user corresponding to the second decision model.

Optionally, the processing unit 820 is specifically configured to: determine a plurality of pieces of training information based on user operations detected by the detection unit 810 in a first time period, where the user operations include operations performed by a plurality of users, and the training information includes touch operation information of the user operations and/or posture information of the terminal device during the user operations; perform clustering processing on the plurality of pieces of training information, to determine at least one training information set; determine, based on information about a second user of the plurality of users, a first training information set corresponding to the second user of the at least one training information set; and determine a decision model for the second user based on training information in the first training information set.

Optionally, the processing unit 820 is specifically configured to: perform clustering processing on the plurality of pieces of training information based on a preset third threshold, where density of training information in each training information set is greater than or equal to the third threshold; and that the processing unit 820 is specifically configured to determine, based on information about a second user of the plurality of users, a first training information set corresponding to the second user of the plurality of training information sets includes: when the information about the second user indicates that the second user is the owner of the terminal device, determining a training information set having highest density of training information in the plurality of training information sets as the first training information set.

Optionally, the processing unit 820 is specifically configured to perform clustering processing on the plurality of pieces of training information according to ordering points to identify the clustering structure (OPTICS) algorithm.

Optionally, the terminal device has at least two operation modes, where in a first operation mode, the terminal device needs to identify whether the user is the owner, and in a second operation mode, the terminal device does not need to identify whether the user is the owner; and optionally, the processing unit 820 is specifically configured to: before the matching degree between the operation information corresponding to the first operation and the first decision model, determine that a current operation mode of the terminal device is the first operation mode.

The terminal device management apparatus 800 may correspond to the terminal device described in the foregoing method 200. In addition, modules or units in the apparatus 800 for user identification are respectively configured to perform actions and processing processes performed by the terminal device in the foregoing method 200. To avoid repetition, detailed description thereof is omitted herein.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, a unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing description is merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
obtaining operation information corresponding to a first operation, wherein the operation information comprises touch information and/or posture information of a terminal device; and
managing the terminal device based on a matching degree between the operation information corresponding to the first operation and a first decision model, wherein the first decision model is determined based on operation information of an operation performed by a first user;
wherein the managing the terminal device based on the matching degree between the operation information corresponding to the first operation and the first decision model comprises:
when the matching degree between the operation information corresponding to the first operation and the first decision model is greater than a preset first threshold, unlocking a first application, wherein the first application is different from a screen unlocking application;
wherein the first user comprises an owner of the terminal device; and
wherein the managing the terminal device based on the matching degree between the operation information corresponding to the first operation and the first decision model comprises:
when the matching degree between the operation information corresponding to the first operation and the first decision model is less than a preset first threshold, determining a second decision model of a plurality of decision models based on the operation information corresponding to the first operation, wherein a matching degree between the second decision model and the operation information corresponding to the first operation is greater than a preset second threshold, or the second decision model is a decision model having a largest matching degree with the operation information corresponding to the first operation in the plurality of decision models, the plurality of decision models are in a one-to-one correspondence with a plurality of users, and each decision model is determined based on operation information of an operation performed by a corresponding user; and
managing the terminal device to selectively permit the first and second users to unlock corresponding applications based on user permission of the first and second users corresponding to the first and second decision models.

2. The method according to claim 1, wherein the touch information comprises at least one of the following information:
information about a force of a touch operation, information about a position of the touch operation, information about a contact area of the touch operation, information about a contact time of the touch operation, information about a sliding angle of the touch operation, information about a sliding direction of the touch operation, or information about a sliding distance of the touch operation.

3. The method according to claim 1, wherein the first operation is an operation detected before a second operation used to start the first application is detected; and
the unlocking the first application comprises:
when the second operation is detected, skipping displaying an unlock interface, and starting the first application; and
the locking the first application comprises:
when the second operation is detected, displaying an unlock interface; or
forbidding starting the first application.

4. The method according to claim 1, wherein the first operation is an operation used to unlock the first application.

5. The method according to claim 1, wherein the first application comprises at least one of the following applications:
an application preset by the owner of the terminal device or an application preset by a manufacturer of the terminal device.

6. The method according to claim 1, wherein the terminal device has at least two operation modes, in a first operation mode, the terminal device needs to identify whether a user is the owner, and in a second operation mode, the terminal device does not need to identify whether the user is the owner; and
before the managing the terminal device based on the matching degree between the operation information corresponding to the first operation and the first decision model, the method further comprises:
determining that a current operation mode of the terminal device is the first operation mode.

7. A method, comprising:
obtaining operation information corresponding to a first operation, wherein the operation information comprises touch information and/or posture information of a terminal device; and
managing the terminal device based on a matching degree between the operation information corresponding to the first operation and a first decision model, wherein the first decision model is determined based on operation information of an operation performed by a first user;
wherein the managing the terminal device based on the matching degree between the operation information corresponding to the first operation and the first decision model comprises:
when the matching degree between the operation information corresponding to the first operation and the first decision model is greater than a preset first threshold, unlocking a first application, wherein the first application is different from a screen unlocking application;
determining a plurality of pieces of training information based on user operations detected in a first time period, wherein the user operations comprise operations performed by a plurality of users, and the training information comprises touch operation information of the user operations and/or posture information of the terminal device during the user operations;

performing clustering processing on the plurality of pieces of training information, to determine training information sets of the plurality of users;

determining, based on information about the plurality of users, training information sets corresponding to the plurality of users of the training information sets; and determining decision models for the plurality of users based on training information in the plurality of training information sets.

8. The method according to claim 7, wherein:

the performing clustering processing on the plurality of pieces of training information comprises:

performing clustering processing on the plurality of pieces of training information based on a preset third threshold, wherein density of training information in each training information set is greater than or equal to the third threshold; and the determining, based on information about a second user in the plurality of users, the first training information set corresponding to the second user of the plurality of training information sets comprises:

when the information about a second one of the plurality of users indicates that the second user is the owner of the terminal device, determining a training information set having a highest density of training information in the plurality of training information sets as a first one of the training information sets.

9. The method according to claim 8, wherein the performing clustering processing on the plurality of pieces of training information comprises:

performing clustering processing on the plurality of pieces of training information according to ordering points to identify a clustering structure (OPTICS) algorithm.

10. The method according to claim 8, wherein further comprising the density of training information comprises:

determining information about frequencies of use of the plurality of users, and determining the training information based a comparison of the frequencies of use;

if the first user has a higher frequency of use, a set having a maximum quantity of points in the plurality of training information sets is set as the training information set, and if another user has a higher frequency of use, a set having a minimum quantity of points in the plurality of training information sets is set as the training information set.

11. A terminal device, comprising:

a sensor, configured to detect operation information corresponding to a first operation, wherein the operation information comprises touch information and/or posture information of the terminal device; and a processor, configured to manage the terminal device based on a matching degree between the operation information corresponding to the first operation and a first decision model, wherein the first decision model is determined based on operation information of an operation performed by a first user;

wherein the processor manages the terminal device based on the matching degree between the operation information corresponding to the first operation and the first decision model comprises:

when the matching degree between the operation information corresponding to the first operation and the first decision model is greater than a preset first threshold, unlocks a first application, wherein the first application is different from a screen unlocking application;

wherein the first user comprises an owner of the terminal device; and wherein the processor is configured to: when the matching degree between the operation information corresponding to the first operation and the first decision model is less than a preset first threshold, determine a second decision model of a plurality of decision models based on the operation information corresponding to the first operation, wherein a matching degree between the second decision model and the operation information corresponding to the first operation is greater than a preset second threshold, or the second decision model is a decision model having a largest matching degree with the operation information corresponding to the first operation in the plurality of decision models, the plurality of decision models are in a one-to-one correspondence with a plurality of users, and each decision model is determined based on operation information of an operation performed by a corresponding user; and manage the terminal device to selectively permit the first and second users to unlock corresponding applications based on user permission of the first and second users corresponding to the first and second decision models.

12. The terminal device according to claim 11, wherein the touch information comprises at least one of the following information:

information about a force of a touch operation, information about a position of the touch operation, information about a contact area of the touch operation, information about a contact time of the touch operation, information about a sliding angle of the touch operation, information about a sliding direction of the touch operation, or information about a sliding distance of the touch operation.

13. The terminal device according to claim 11, wherein the first operation is an operation detected before a second operation used to start the first application is detected; and when unlocking the first application, the processor is configured to: when the second operation is detected, skip displaying an unlock interface, and start the first application; and when locking the first application, the processor is configured to: when the second operation is detected, display an unlock interface when the second operation is detected, or forbid starting the first application.

14. The terminal device according to claim 11, wherein the first operation is an operation used to unlock the first application.

15. The terminal device according to claim 11, wherein the first application comprises at least one of the following applications:

an application operated by the first operation, an application preset by the owner of the terminal device, or an application preset by a manufacturer of the terminal device.

16. The terminal device according to claim 11, wherein the processor manages the terminal device based on the matching degree between the operation information corresponding to the first operation and the first decision model comprises:

when the matching degree between the operation information corresponding to the first operation and the first decision model is less than a preset first threshold, locks the first application.

* * * * *